US011782570B2

(12) United States Patent
Hsiao

(10) Patent No.: US 11,782,570 B2
(45) Date of Patent: Oct. 10, 2023

(54) INTEGRATION PLATFORM OF INTERNET OF THINGS AND VIRTUAL DEVICE

(71) Applicant: Jue-Hsuan Hsiao, New Taipei (TW)

(72) Inventor: Jue-Hsuan Hsiao, New Taipei (TW)

( * ) Notice: Subject to any disclaimer, the term of this patent is extended or adjusted under 35 U.S.C. 154(b) by 117 days.

(21) Appl. No.: 16/888,669

(22) Filed: May 30, 2020

(65) Prior Publication Data

US 2020/0393952 A1    Dec. 17, 2020

Related U.S. Application Data

(63) Continuation-in-part of application No. 15/439,950, filed on Feb. 23, 2017, now abandoned.

(51) Int. Cl.
| | |
|---|---|
| G06F 3/04847 | (2022.01) |
| G06F 3/04815 | (2022.01) |
| G16Y 40/35 | (2020.01) |
| G06F 3/0482 | (2013.01) |
| G06T 19/00 | (2011.01) |

(52) U.S. Cl.
CPC ........ *G06F 3/04815* (2013.01); *G06F 3/0482* (2013.01); *G06F 3/04847* (2013.01); *G06T 19/003* (2013.01); *G06T 19/006* (2013.01); *G16Y 40/35* (2020.01)

(58) Field of Classification Search
CPC ............... G06F 3/04815; G06F 3/0482; G06F 3/04817; G06F 3/04847; G06T 19/006; G06T 19/003; G16Y 40/35
See application file for complete search history.

(56) References Cited

U.S. PATENT DOCUMENTS

| | | | | |
|---|---|---|---|---|
| 6,844,807 | B2* | 1/2005 | Inoue | G05B 15/02 |
| | | | | 340/3.7 |
| 10,779,085 | B1* | 9/2020 | Carrigan | G06F 3/0482 |
| 2004/0010327 | A1* | 1/2004 | Terashima | G05B 15/02 |
| | | | | 700/83 |
| 2009/0079740 | A1* | 3/2009 | Fitzmaurice | G06F 3/04815 |
| | | | | 345/427 |
| 2012/0268286 | A1* | 10/2012 | Jin | H04W 4/80 |
| | | | | 340/815.4 |
| 2013/0083193 | A1* | 4/2013 | Okuyama | G08C 17/02 |
| | | | | 348/143 |
| 2014/0184520 | A1* | 7/2014 | Zhang | G06F 3/0488 |
| | | | | 345/173 |
| 2014/0236325 | A1* | 8/2014 | Sasaki | G06F 3/0488 |
| | | | | 700/90 |
| 2014/0257525 | A1* | 9/2014 | Nagamatsu | H04L 12/2816 |
| | | | | 700/28 |
| 2015/0304171 | A1* | 10/2015 | Kim | G06F 3/0482 |
| | | | | 715/733 |
| 2015/0347850 | A1* | 12/2015 | Berelejis | H04L 67/22 |
| | | | | 345/633 |

(Continued)

OTHER PUBLICATIONS

M. Davies and V. Callaghan, "iWorlds: Building Mixed Reality Intelligent Environments Using Customisable 3D Virtual Worlds," 2010 Sixth International Conference on Intelligent Environments, 2010, pp. 311-314, doi: 10.1109/IE.2010.63. (Year: 2010).*

Primary Examiner — Dino Kujundzic

(57) ABSTRACT

Disclosed are an IoT integration platform and a virtual device used thereon. The IoT integration platform and the virtual device are provided for users to control a target device of a real world corresponding to the virtual device, and the virtual device is capable of reflecting the status of the target device timely.

20 Claims, 20 Drawing Sheets

(56) References Cited

U.S. PATENT DOCUMENTS

| | | | |
|---|---|---|---|
| 2015/0358777 A1* | 12/2015 | Gupta | H04L 12/2807 370/254 |
| 2016/0005229 A1* | 1/2016 | Lee | G06F 3/0488 345/419 |
| 2016/0054791 A1* | 2/2016 | Mullins | G06T 19/006 345/173 |
| 2016/0148417 A1* | 5/2016 | Kim | G06T 19/006 345/419 |
| 2016/0291826 A1* | 10/2016 | Verzano | H04L 41/145 |
| 2018/0173396 A1* | 6/2018 | Lin | H04N 7/18 |
| 2018/0241943 A1* | 8/2018 | Lee | H04N 5/23293 |

* cited by examiner

FIG. 11

INTEGRATION PLATFORM OF INTERNET OF THINGS AND VIRTUAL DEVICE

The present invention relates to an Internet of Things (IoT) integration platform, and more particularly to the IoT integration platform implemented by a new control method based on a new representative structure of an IoT target device.

BACKGROUND OF THE INVENTION

As time evolves, mobile communications and the Internet are used more extensively. In the concept of the recently developed Internet of Things (IoT), the IoT is provided for the central management/control of machines, equipment, and people. For example, the IoT is applied in different areas such as home electronic devices, transportation means (including cars and motorcycles), physiological signal monitoring instruments for medical treatment, searches for a location, anti-theft functions, etc.

However, conventional IoT devices come with a limited variety in their application, and different cloud object control methods do not have a consistent standard mode, thus providing a limited choice to users and causing an extreme inconvenience of use. In detail, the IoT device control methods are not consistent, so the users have to adapt and learn the control interfaces of the IoT devices manufactured by different manufacturers (since each IoT device has its exclusive control interface or App program). As a result, the willingness of buying IoT products is very low (because the different control interfaces cause extreme inconvenience and trouble to the users), and the IoT integration and development for both home and working environments cannot be improved.

In present IoT applications, a target device of the Internet of things (hereinafter referred to as a "target device") is generally presented by an icon in the building floor plan, but a general handheld electronic device (such as a mobile phone or a tablet PC) only has a small display screen, so the icon must be very small and crowded and stacked together, and it is very inconvenience for the users to view the status of the target device and it sometimes even causes additional operations, and the use is unsuitable for elder users or people with poor eyesight. In addition, the icon is just a figure without any loaded or operable software on it, and almost has no support management and expandability function.

In view of the aforementioned drawbacks of the prior art, it is the main subject for related manufacturers to provide an IoT target device with a safe, convenient, and user-friendly operating method.

SUMMARY OF THE INVENTION

To achieve the aforementioned and other objectives, the present invention discloses a configuration of a virtual device corresponding to a target device applied in the IoT. The virtual device is used in an electronic device having a controlling and displaying interface and connected to the Internet, and capable of controlling a target device corresponding to the virtual device via the Internet. In a 3D virtual world, the controlling and displaying interface shows a 3D scene map to simulate a 3D building layout of the real world, the virtual device represents the target device in the 3D mode of the real world and is comprised of a virtual device model and at least one emulation program package loaded in and operated on the virtual device model, and a control command issued by the virtual device and sent out from the electronic device via a network to control the target device and update a new status value in a database and emulate a new simulation status, and read a stored status value back from the database once for every several seconds to update the simulation status, wherein the virtual device model has an external shape similar to that of the target device, and an operation, a controlling and a status reflection of an operation simulating those of the target device.

To achieve the aforementioned and other objectives, the present invention further provides an IoT integration platform, comprising:

a main control device, coupled to the Internet, and having a controlling and displaying interface primarily for operation and display, a scene display area for displaying a part of a 3D scene map created by a professional App, and a bottom slider area of the controlling and displaying interface further comprising a slider, divided into a plurality of division areas;

at least two target devices, coupled to the main control device via a wireless network;

at least two virtual devices, each corresponding to the target device, and having three display modes: a normal sized virtual device, an enlarged virtual device, and a full screen virtual device, wherein the virtual device comprises a virtual device model and at least one emulation program package loaded in and operated on the virtual device model, and the main control device is provided for sending out a control command through a network to control the corresponding target device, updating a new status value in the database and self-updating to a new simulation status, reading back the status value from the database once for every several seconds, and updating the status; the virtual device model has an external shape substantially the same as that of the target device, an operation, control and status reflection of a behavior timely simulates the corresponding target device;

at least one portable electronic device, coupled to the Internet via a wireless network or a mobile network, for downloading the 3D scene map, navigating on the 3D scene map, and controlling and observing the virtual device on the 3D scene map; and at least one client server, coupled to the main control device via a wireless network, for storing the 3D scene map sent from the main control device and a sharer's information of the 3D scene map, and loading the 3D scene map into the portable electronic device for an operation or control, wherein the database is installed in the client server.

Wherein, the 3D scene map further comprises a virtual navigation mark, so that users can browse the 3D scene map and view the virtual device status by dragging the virtual navigation mark; and at least one vendor's server, coupled to the main control device via a wireless network, for storing the corresponding issued virtual device compressed information package in the vendor's server, and performing a plug-and-play download function to the 3D scene map when the target device is installed, and then decompressing the virtual device compressed information package into two parts including a virtual device model and at least one emulation program package loaded in and operated on the virtual device model, and co-operated as a virtual device;

Wherein, the two target devices and the installed main control device are installed in the same building, so that when a user operates and controls the virtual device, the virtual device sends a control command to each respective target device through the main control device, and simulates the action and status thereof.

Wherein, after the target device is newly installed each time, the source file of the 3D scene map has to be re-compiled to output a new execution file which is stored in at least one client server and provided for at least one portable electronic device to download and operate on it.

In the present invention, the electronic device (such as a notebook, a personal computer, a tablet PC, or a mobile phone) has a 3D virtual world displayed on a screen, a 3D virtual device compressed information package (the source files will be described in details later in the embodiment) corresponding to the target device, which can be decompressed into a 3D virtual device model and at least one emulation program package loaded in and operated on the virtual device model in a virtual 3D building layout (hereinafter referred to as a "3D scene map") of a 3D building (and both of the 3D virtual device model and the emulation program package are generally called "virtual device") and representing the target device, and the virtual device is capable of emulating the morphological shape (substantially similar to the shape of the target device) and the behaviors (including the operation, control, and status reflection) of the target device. In other words, the virtual device can issue a control command via the Internet (or other wireless communications) to control the target device, update a new status in the database, and self-update to a new simulation status (such as an electric fan virtual device having fan vanes with multi-stage buttons including a stop button and a swing button). Just like the target device (or the electric fan virtual device), after a click or tap (hereafter, click or tap is abbreviated as click) on a speed-1 button of the electric fan virtual device is sensed, the button will be simulated to be pressed and stuck, so that the fan vanes of the electric fan virtual device will be simulated to rotate, while the electric fan virtual device will issue a control command (SPD1) via a wireless network (or other wireless communications) to control the target device (e.g. electric fan target device) to rotate at the speed-1, and a new status value of a database (installed in a client server) is updated to the speed-1. If the swing button is pressed, the swing button will be simulated to be pressed and stuck, and the electric fan target device and the corresponding virtual device will start swinging.

BRIEF DESCRIPTION OF THE DRAWINGS

FIG. 11 shows a status push notification setting AOP procedure of a virtual device in a 3D scene map in accordance with the present invention;

DESCRIPTION OF THE PREFERRED EMBODIMENTS

Figure 1:
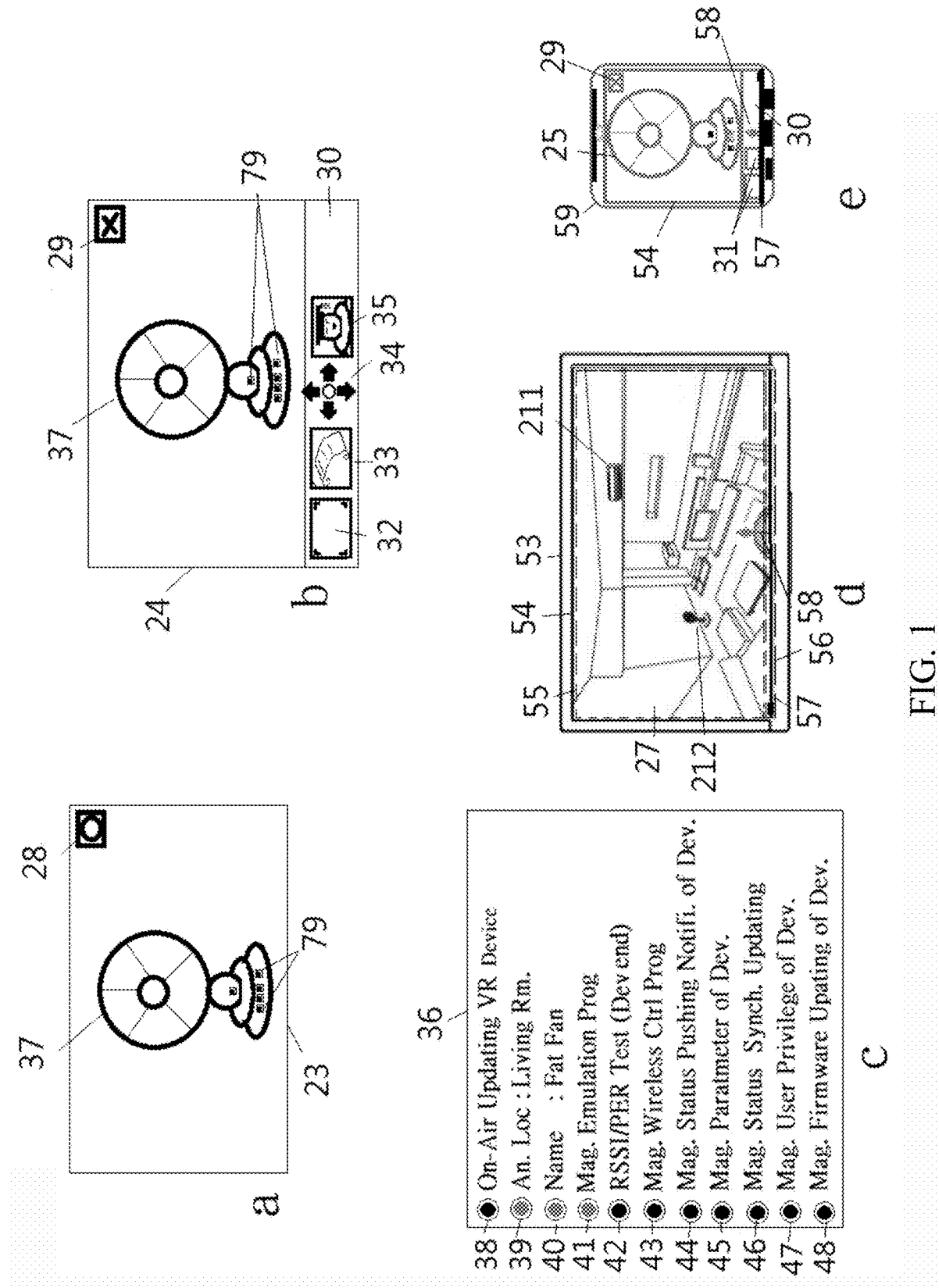
FIG. 1 shows a typical content of a compressed information package of a virtual device stored in a vendor's server and an operation method in accordance with the present invention.

The technical characteristics of the present invention will become apparent with the detailed description of preferred embodiments accompanied by the illustration of related drawings.

The present invention discloses a novel virtual device 21 which includes has three display modes such as a normal sized virtual device 23, an enlarged virtual device 24 and a full screen virtual device 25, and they all can emulate the target device 26 on morphology and behavior; the normal sized virtual device 23 comes with a size in proportion to the 3D scene map 27, and can be moved and set to an equivalent position (In other words, the target device 26—the electric fan target device 262 is installed in a living room, and the corresponding virtual device 21—the electric fan virtual device 212 is set at the same corresponding position of the living room in the 3D scene map 27; and the normal sized virtual device 23 has a circle button object 28 disposed at the upper right corner; and the enlarged virtual device 24 has a hidden-able control operating area 30 disposed along the bottom thereof, and carries a plurality of Specific Button Object (SBO) (hereinafter referred to as a "SBO button 31"), and its upper right corner has an X button 29 (also known as close button object 29); and the full screen virtual device 25 uses the whole scene display area 55 to display the enlarged virtual device 24 and allows elder users to operate conveniently in order to reduce wrong operations, and its upper right corner also has an X button 29 for turning off the full screen virtual device 25; when a circle button object 28 is clicked to "show out" the hidden-able control operating area 30 and form as the enlarged virtual device 24, and the close button object 29 at the upper right up corner is clicked again to "hide" the hidden-able control operating area 30 and form as the normal sized virtual device 23; wherein the hidden-able control operating area 30 will disappear when not needed, so that the whole scene display area 55 becomes clearer.

In addition, a hidden-able control operating area 30 is disposed under the enlarged virtual device 24 and carries several SBO buttons 31 for selecting. When a click on each specific button object is sensed, a series of specific VR window objects are carried out sequentially for operating to complete a procedure for a specific purpose not provided in the original target device. These serial VR window objects invoked in an Associated Operating Procedure are called AOP procedure 51 hereinafter. A structure of virtual device 21 carrying out at least one AOP procedure 51 is called an AOP-enhanced virtual device 52 (please refer to FIG. 8).

Based on the structure of this novel virtual device 21, the following embodiments are provided for the disclosure of further designs of the present invention:

With reference to FIG. 1 for the first embodiment of the present invention, the typical contents of a virtual device compressed information package 22 stored in a vendor's server and an operation method 1 of a virtual device 21 are disclosed.

Figure 20:
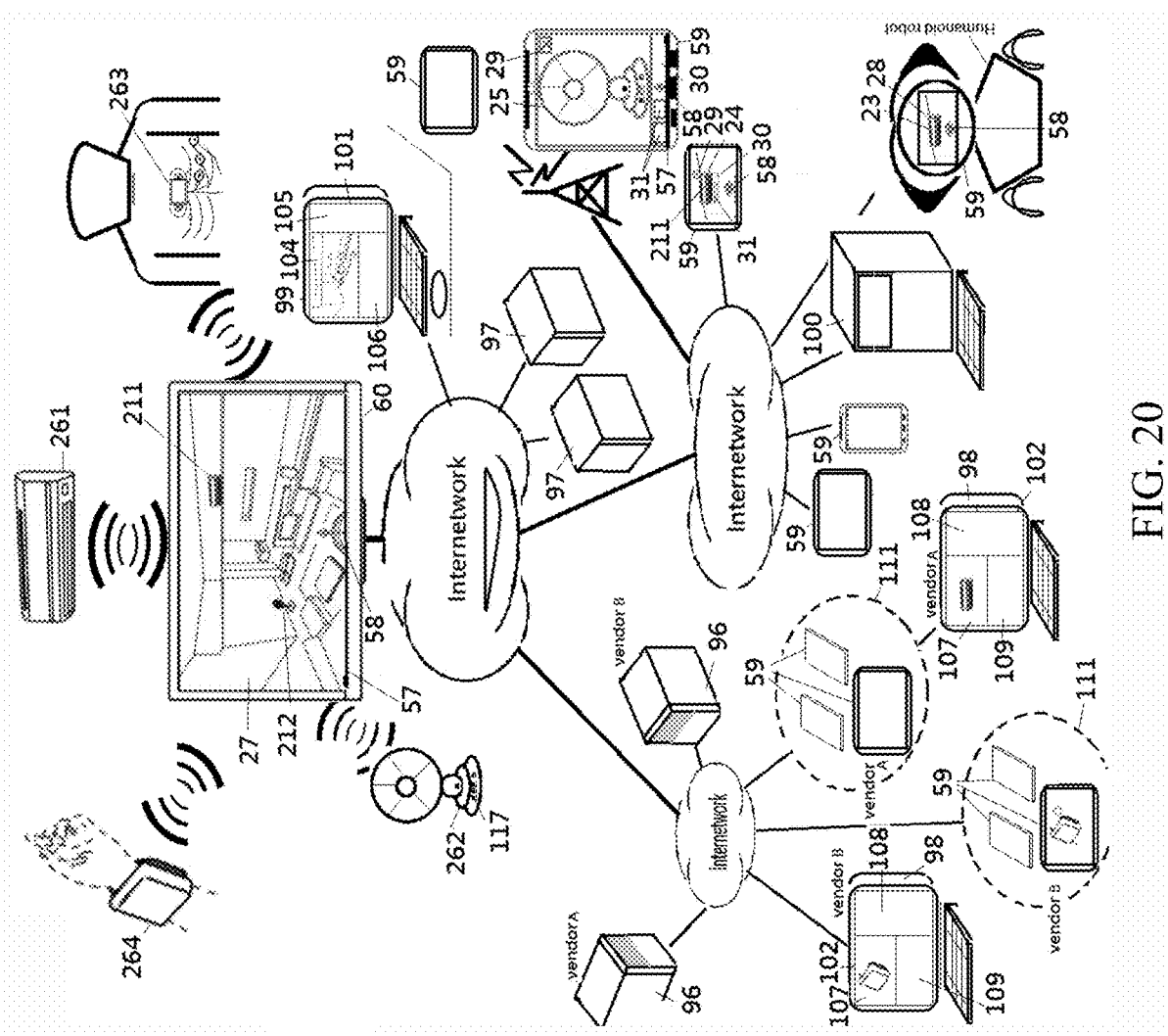
FIG. 20 shows the concept of an IoT integration platform and its system operation in accordance with the present invention.

In a normal sized virtual device 23 (as shown in FIG. 1a), the virtual device model 37 has a clearly visible emulated target device button 79 (corresponding to the target device physical button 117 as shown in FIG. 20). In an enlarged virtual device 24 (as shown in FIG. 1b), and one full screen virtual device 25 (as shown in FIG. 1e), the contents of an emulation program package 36 is shown in FIG. 1c. In FIG. 1a, the circle button object 28 is clicked to show an enlarged virtual device 24. In FIG. 1B, the hidden-able control operating area 30 is shown and it varies according to the functions of the virtual device 21 and has a plurality of different SBO buttons 31. In this embodiment as shown in FIG. 1, there are four buttons including a full screen virtual device SBO button 32, an emulation programs management SBO button 33, a moving/anchored SBO button 34, and an intelligent control settings SBO button 35 and so on.

When the buttons (specific button objects) on the "appeared" hidden-able control operating area 30 are clicked, their respect AOP procedures 51 will be carried out as below described respectively:

If the full screen virtual device SBO button 32 is clicked, the full screen virtual device 25 of the virtual device 21 will be displayed to allow elderly users to control and view the operation status more clearly without errors.

If the moving/anchored SBO button 34 is clicked, the virtual device 21 will be moved and anchored.

If the intelligent control settings SBO button 35 is clicked, an intelligent control setup will be expanded intelligently. For example, if one needs to set a complex parameter intelligent conditional expression as (Temp.>30 & T(Clock) =7.00 & Hum.>55). It means if the temperature is higher than 30 degrees, the time is 7:00 am, and the humidity is greater than 55%), then the heterogeneous control as: Set Fat Fan to G1+S & Set Dehumi to DH1+S & Close F. Window (it means that the fan is set to Speed 1 and the swing mode is on, and the dehumidifier is set to Speed 1 and the wind changing direction launched, and the front window is closed). Please be noted that the fan, dehumidifier, and electric window are heterogeneous equipment).

If the emulation programs management SBO button 33 is clicked, a program management operation of the virtual device emulation program package 36 will be executed as follows:

These four AOP procedures 51 are provided as examples for illustrating the present invention but are not intended for limiting the scope of the invention.

As to the virtual device emulation program package 36 (hereinafter referred to as an "emulation program package 36"), it is a program set loaded in and operated on the virtual device model 37 and its program combination varies according to the function of the virtual device 21. The emulation program package 36 typically comprises:

an On-air updating VR dev. 38, for managing the updates of the virtual device compressed information package;

an Anch. Loc. 39, for showing an anchored position;

a Device Name 40, for showing a device name;

a Mag. emulation prog. 41, for implementing the management of an emulation program of the target device 26;

an RSSI/PER Test VR end 42, is a short-range wireless channel (such as Wi-Fi, Bluetooth, and ZigBee channels) communication quality (RSSI/PER, etc.) test program, for operating with the Short-range Wireless Communication RSSI/PER Test Virtual Tool to test the communication quality between the short-range wireless communication protocol unit built in the target device 26 and the main control device 60;

a Mag. wireless control prog. 43, is a control program for managing a short-range wireless control program (such as turning on or off a home appliance) or accessing data (including physical data such as temperature, heart rhythm, gas concentration, and light illumination) through using a short-range wireless communication protocol (such as Wi-Fi, Bluetooth, ZigBee, etc.) for the wireless control of a home appliance or the wireless access of the status sensing; the management options include (RESET, RESTART, STOP, Statistics Enable (Default Enable), and Alert Enable (Default Enable));

a Mag. status push notification of dev. 44, for managing a status push management program of the target device 26, with the push settings included (target of push notification, push channel, push condition, push content), and push actions including: start push, stop push, and push immediately;

a Mag. parameters of dev. 45, for managing a status parameter management program of the target device 26 to set exporting the device status parameter (such as an ON/OFF status parameter of an electric lamp, a temperature parameter and a humidity parameter of a smart air-conditioner, a light illumination parameter, a $CO_2$ concentration parameter, etc.) or to set importing all exported device status parameters in the 3D scene map 27 (such as a humidity sensing parameter of a master bedroom dehumidifier, a gas concentration sensing parameter of a gas sensor in a kitchen, etc.) to facilitate using the intelligent control settings SBO button 35 (described in another embodiment below) to setup the status parameters combination of the intelligent control condition or sensing condition of a plurality of devices;

a Mag. synch. status updating 46, for managing the status update program of the target device 26 to request the current status of the target device 26 from a database of the client server 97 and update the status of the virtual device instantly, so as to achieve the effect of showing the status of the virtual device 21 always synchronously with the target device 26 under the multi-machine (and multiuser) operation on the target device 26;

a Mag. user privilege of dev. 47, by which for managing a usage privilege management program, of the target device 26 to add, edit, delete, and storing a device sharing user privilege list in order to prioritize and control the sharing of the target device 26;

a Mag. firmware updating of dev. 48, by which for managing of an Online Updating of the target device firmware 49, wherein the management options provided include searching the latest version, updating now, and recovering (not shown) for online updating a firmware version of the target device 26 that allows the target device 26 to continuously improve function, quality and safety after leaving the factory and sold; (Note: VR stands for virtual, Anch. Loc stands for anchored location, Mag. stands for Managing, dev. stands for device, and prog. stands for program).

The typical content of an emulation program package 36 is described above, but this invention is not limited to such arrangement only. Each option is to start the start portal of an AOP procedure 51, and such AOP procedure 51 allows the emulation program package 36 fully to add a multi-oriented control ability and to improve the management ability, which is called as an AOP program function. Wherein, the on-air updating VR dev. 38 is a start portal of AOP to update the virtual device compressed information package 22 to implement the evolution of the virtual device 21 continuously and the mag. firmware updating of dev. 48 is another start portal of AOP to update the target device firmware 49, which is the key to the continuous evolution of the target device firmware 49. Each corresponding AOP procedure 51 used for achieving its special purpose will be described in detail in the following embodiments.

This embodiment discloses a new representative structure of a virtual device 21 better than the icons conventionally used today in the IoT, and the virtual device 21 of the present invention has three display modes capable of emulating morphology and behaviors. In addition to the simpler and more direct operation and the more realistic display, the emulation program package 36 includes the basic control abilities of the icons and many functions of the AOP procedures 51, which can be used to expand many management operations and functions which are not available provided in the target device 26 originally, and the functions of these AOP procedures 51 generally includes (but not limited to), the sharing management of the virtual device 21, event push notification settings, active status update, parameter export public use, network security prevention, intelligent control settings, intelligent display, intelligent operation, etc.

Based on the aforementioned new representative structure of the virtual device 21, this embodiment further discloses an IoT new control method (as shown in FIGS. 1*d* and 1*e*), wherein an electronic device 53 is connected to the Internet, and a controlling and displaying interface 54 is used for operating and displaying as an interface and divided into a top scene display area 55 and a bottom slider area 56, and the scene display area 55 is primarily provided for displaying a 3D scene map 27 (partially), and the virtual device 21 (such as the electric fan virtual device 212) represents a target device 26, and the 3D scene map 27 always simulates and shows the operation and the status of the target device 26; and the 3D scene map 27 also has a virtual navigation mark 58 (which carries a 3D virtual world perspective lens at a position with a height of 175 cm at the back of) for touring the whole building and observing or viewing a scene (within a viewing angle) and the status of the virtual device 21. When the circle button object 28 at the upper right corner of the virtual device 21 is clicked, the same position in a 3D scene map 27 represents the same target device 26 which is shown as the enlarged virtual device 24 for convenient control and operation. Just like the operation of a real target device 26, this arrangement also avoids the unbearable confusion of the controlling and displaying interface 54. If the portable electronic device 59 (as shown in FIG. 1*e*) is used as a multi-user remote control, and through the different sight of the virtual navigation mark 58 on a 3D scene map 27 can be used to achieve the effect of operating several target devices 26 simultaneously and displaying their statuses synchronously. Obviously, such configuration and arrangement are very useful.

This electronic device 53 can be a main control device 60 (as shown in FIG. 1*d*) or a portable electronic device 59 (as shown in FIG. 1*e*).

In FIG. 1*d*, the electronic device 53 has at least two target devices 26 (provided by two different manufacturers) can be used for the controlling via a network, and the control method includes the following operations executed by a processor system of the electronic device 53:

A scene display area 55 is disposed at the top of a controlling and displaying interface 54, and a bottom slider area 56 has a slider 57, and the scene display area 55 primarily shows a part of a 3D scene map 27 representing a building layout and also includes a virtual device 21 corresponding to a target device 26, wherein the virtual device 21 can be moved, anchored (or fixed).

The controlling and displaying interface 54 shows a behavior status of a virtual device 21 which emulates the corresponding target device 26.

A user can use a mouse or a finger to drag the virtual navigation mark 58 and tour the whole 3D scene map 27 of the building on the controlling and displaying interface 54, and to view the emulated behavior status of the virtual devices 21 corresponding to the target devices 26 at all positions and including a quick walking up and down stairs of the virtual navigation mark 58 in the 3D scene map 27 on the controlling and displaying interface 54.

In addition, a scene management virtual tool 61 is installed onto the slider 57 (which will be described later in the second embodiment) and provided for improving the operations convenience, security management, and intelligent ability of the 3D scene map 27, and assisting the virtual navigation mark 58 to move quickly.

When a sensible area or button of a virtual device 21 representing the operation of a target device 26 is selected (or sensed), a control command is outputted from the virtual device 21 on the electronic device 53 to the Internet according to the operation of the virtual device 21, and the control command is used to control operating the target device 26 corresponding to the virtual device 21 and record a new status record into a database, and the virtual device 21 immediately emulates a behavior status change of the target device 26 corresponding to the virtual device 21. In addition, the virtual device 21 reads back a current status value (which can be changed by other users in the past) from the database within a period (such as 3-5 seconds) to update a new emulation status of the virtual device 21, so as to maintain the status of the target device 26 synchronously; and if the circle button object 28 at the upper right corner of the normal sized virtual device 23 representing the target device 26 is selected, its enlarged virtual device 24 will be shown;

if the X button 29 at the upper right corner of the enlarged virtual device 24 representing the target device 26 is selected, its normal sized virtual device 23 will be shown;

if the sensible area or button on a hidden-able control operating area 30 is selected, many unavailable operations not provided originally of the target device 26 (as shown in FIG. 1b) will be expanded, and these operations include improving the management ability and expanding the intelligent function of the target device 26. The functions of these AOP procedures 51 include a sharing management, an event push notification setting, an active status update, a parameter export public use, a network security prevention, an intelligent control settings, an intelligent display and an intelligent operation of the virtual device 21 (which will be described in the following embodiments); This novel design of the new structure of virtual device 21 letting the IoT integrates artificial intelligence (AI) into some intelligent scenes (such as smart home, smart hospital, and smart farm), so as to achieve the effects of opening a door of IoT to AI, or even build a solid bridge to AI.

Based on the aforementioned new IoT control method, the controlling and displaying interface 54 displays including a 3D scene map 27, a virtual navigation mark 58, at least one virtual device 21, a slider 57 having some scene management virtual tools 61 loaded therein and operated thereon, and all of the above are a main core of the present invention.

Figure 2:
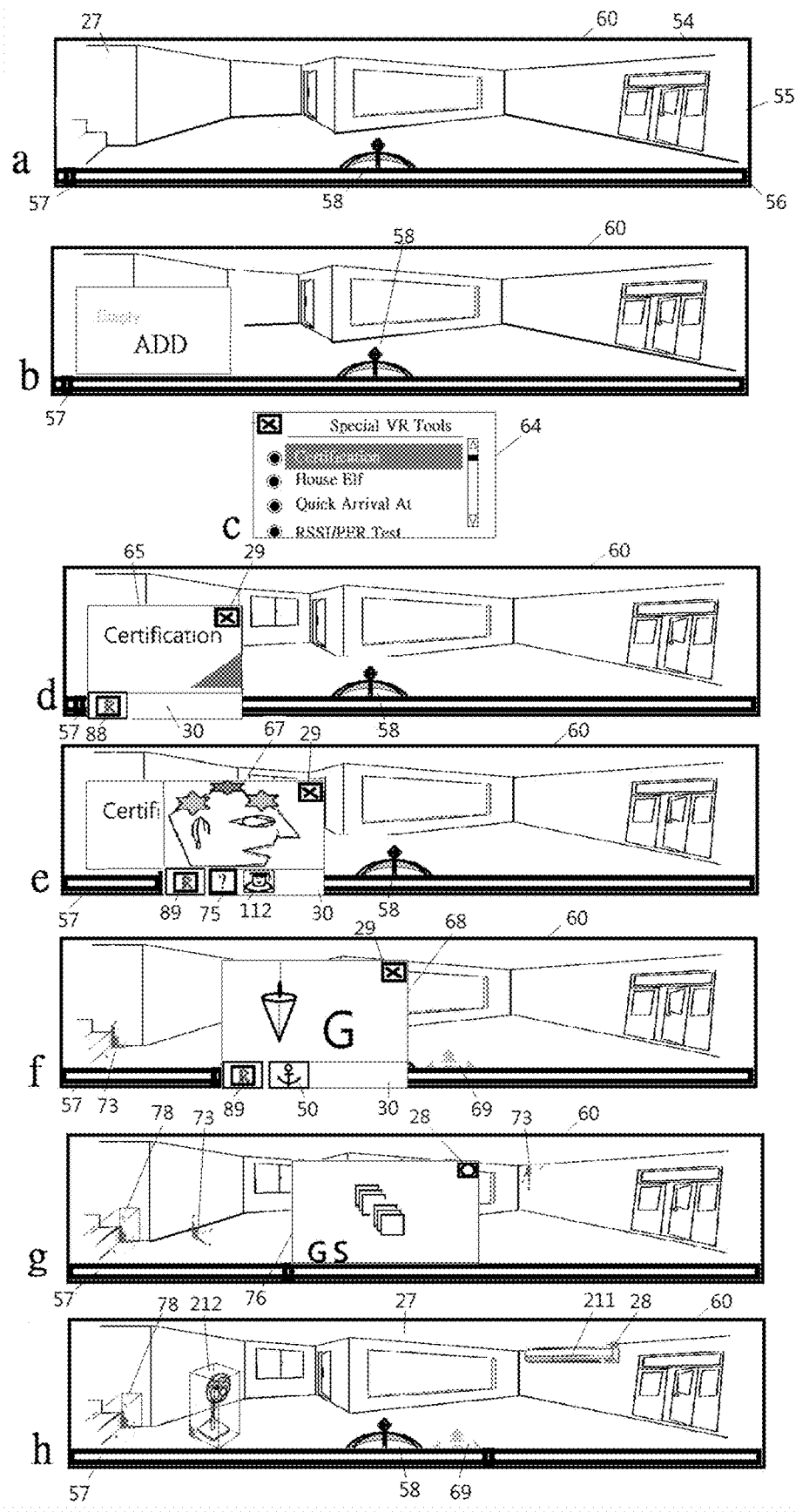
FIG. 2 shows the procedure of installing a scene management virtual tool to a slider in accordance with the present invention.

With reference to FIG. 2 for a schematic view of installing a set of scene management virtual tools 61 to a slider 57 in accordance with the second embodiment of the present invention 2; in FIG. 2a shows that the main control device 60 shows a corner of a living room in a 3D scene map 27, and the controlling and displaying interface 54 shows that a scene display area 55 and a slider 57 installed in a bottom slider area 56, and the scene display area 55 shows a corner of the living room of the 3D scene map 27, but the entrance of the stairs still have no stairs transparent sensing gate generator virtual tool 62 yet (which will be disclosed in the eighteenth and nineteenth embodiments below); it is used to sense a virtual navigation mark 58 and assisting going up and down stairs.

In FIG. 2b shows the virtual tool 63 is installed onto the slider 57, and the installation procedure includes the steps of: moving the slider 57 to an empty division area (marked with a text label ADD); clicking the text label ADD to open a scene management virtual tool selection window 64 as shown in FIG. 2c, wherein the window has a side slider provided for assisting browsing; selecting a scene management virtual tool 61 to add and then closing the scene management virtual tool selection window 64. In FIG. 2d, a target device safety certification virtual tool 65 is installed onto the slider 57 already, and the enlarged virtual tool 66 is shown, and its hidden-able control operating area 30 has shown up already. Now, if the green R SBO button 88 is clicked thereon, the target device safety certification virtual tool 65 will always reside on the controlling and displaying interface 54. The aforementioned FIGS. 2b, 2c, and 2d disclose the procedure of installing the Virtual Tool 63 onto the slider 57.

In FIG. 2e, a smart housekeeper virtual tool 67 is further installed onto the slider 57, and its enlarged virtual tool 66 is enabled, and its hidden-able control operating area 30 has shown up. Now, if a question marker SBO button 75 is clicked thereon, then the smart housekeeper virtual tool 67 can be requested to assist in finding a virtual device 21. If a red R SBO button 89 of the smart housekeeper virtual tool 67 is clicked, then the smart housekeeper virtual tool 67 can be removed from the slider 57; in the hidden-able control operating area 30 of the smart housekeeper virtual tool 67 further has an another housekeeping intelligent control settings SBO button 112 thereon (more detail described in the operation method of the twentieth embodiments).

In FIG. 2f, a quick positioning marker generator virtual tool 68 is further installed onto the slider 57, and the quick positioning marker generator virtual tool 68 has enabled an enlarged mode, and a quick positioning marker virtual tool 69 has been placed in the 3D scene map 27 (which will be described in more detail in the operation method of the following embodiments). In addition, the hidden-able control operating area 30 of the quick positioning marker generator virtual tool 68 has a list anchors SBO button 50 thereon; According to this procedure as stated above, a stairs transparent sensing gate generator virtual tool 62 (not shown), appliance anchor point generator virtual tool 70 (not shown), a countdown timer generator virtual tool 71 (not shown) and a world time virtual tool 72 (not shown) are all installed sequentially (which will be described in more detail in each operation method of the following embodiments. In FIG. 2f, the appliance anchor point generator virtual tool 70 has already arranged an appliance anchor point virtual tool 73 at the entrance of the stairs to prepare for constructing a stairs transparent sensing gate virtual tool 74 thereon.

In FIG. 2g, after two appliance anchor point virtual tools 73 are added, a 3D scene map sharing usage privilege setting virtual tool 76 (hereafter also abbreviated as GS VR tool 76) is added onto the slider 57, and shown in a normal sized virtual tool 82; Thereafter, a D-half stairs transparent sensing gate virtual tool 78 is installed at the entrance of up stair. Similarly, another U-half stairs transparent sensing gate virtual tool 77 (not shown) is installed at the entrance of down stairs.

In FIG. 2g, some virtual tools 63 have been installed to the slider 57 already, and from a circle button object 28 at the upper right corner, we know that one plug-and-play air-conditioner virtual device 211 has been installed already; but another plug-and-play electric fan virtual device 212 is being installed (since the outer frame shows that a displacement or rotation adjustment is being made, but an anchorage has not been set yet); In FIG. 2g, a D-half stairs transparent sensing gate virtual tool 78, a virtual navigation mark 58, and a quick positioning marker virtual tool 69 are shown simultaneously. If a user uses a mouse or a finger to guide the virtual navigation mark 58 near to the air-conditioner virtual device 211, then an operation or control can be made on it (please refer to the ninth embodiment), and its simulation status can be seen immediately. In the same manner, if a mouse or a finger is used to guide the virtual navigation mark 58 near to the electric fan virtual device 212, the electric fan can be easily controlled and the simulation status can also be seen immediately.

In the second embodiment 2, the function and importance of a set of scene management virtual tools 61 in a 3D scene map 27 are disclosed, and the convenient and quick installation method of the virtual tool of a slider 57 is also disclosed.

Figure 3:
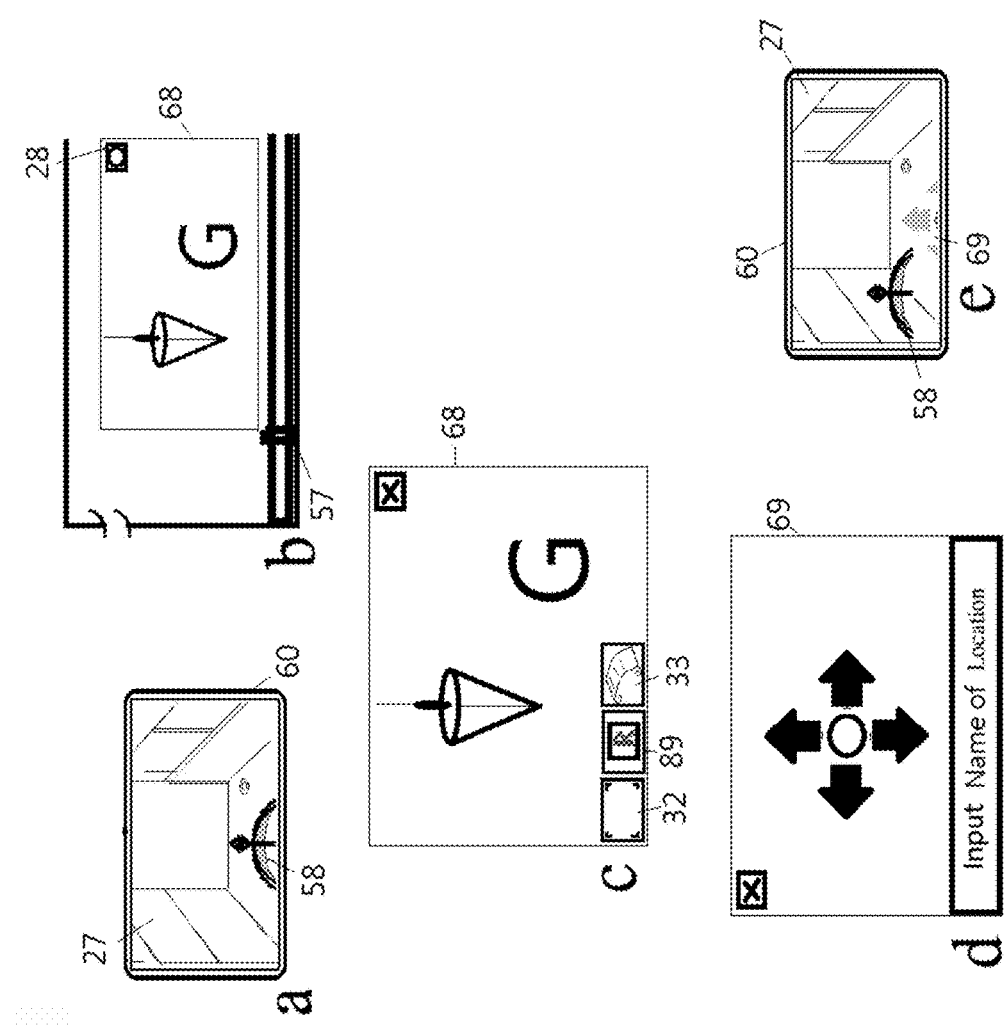
FIG. 3 shows a way of selecting a quick positioning marker generator virtual tool from a slider and laying a quick positioning marker virtual tool in a 3D scene map in accordance with the present invention.

For a very large scene (such as a hypermarket or a department store), touring a scene is not an easy job. With reference to FIG. 3 for the third embodiment 3, a way of selecting a quick positioning marker generator virtual tool 68 from a slider 57 and laying a quick positioning marker virtual tool 69 in a 3D scene map in accordance with the present invention 3 is disclosed;

Firstly, the virtual navigation mark 58 is dragged touring to the doorway of a washing room; the main control device 60 shows that the virtual navigation mark 58 has toured its way to the doorway of the washing room as shown in FIG. 3a, and then a quick positioning marker generator virtual tool 68 on the slider 57 is found as shown in FIG. 3b. The circle button object 28 of the quick positioning marker generator virtual tool 68 is clicked to open its enlarged virtual tool 66 as shown in FIG. 3c.

In FIG. 3c, a G Sign is clicked directly to produce a quick positioning marker virtual tool 69 as shown in FIG. 3d; FIG. 3c further has a full screen virtual device SBO button 32 and an emulation programs management SBO button 33 (more detailed description of the operation method of the fourth embodiment and the first embodiment respectively).

In FIG. 3d, the operations selected from the quick positioning marker virtual Tool 69 include the options of: (i) Move for moving the quick positioning marker virtual tool 69, (ii) Input name of location (for example the washing room), (iii) Click a middle circle anchorage to anchor, and (iv) click X button to remove the quick positioning marker virtual tool 69.

In FIG. 3e, we can see a quick positioning marker virtual tool 69 has been set at the washing room on the main control device 60.

According to this procedure and a list anchors SBO button 50 (please reference FIG. 6b in the sixth embodiment), the full-court anchorage layout of a 3D scene map 27 (regardless of the hypermarket or department store) can be completed, and then touring easy.

Figure 4:
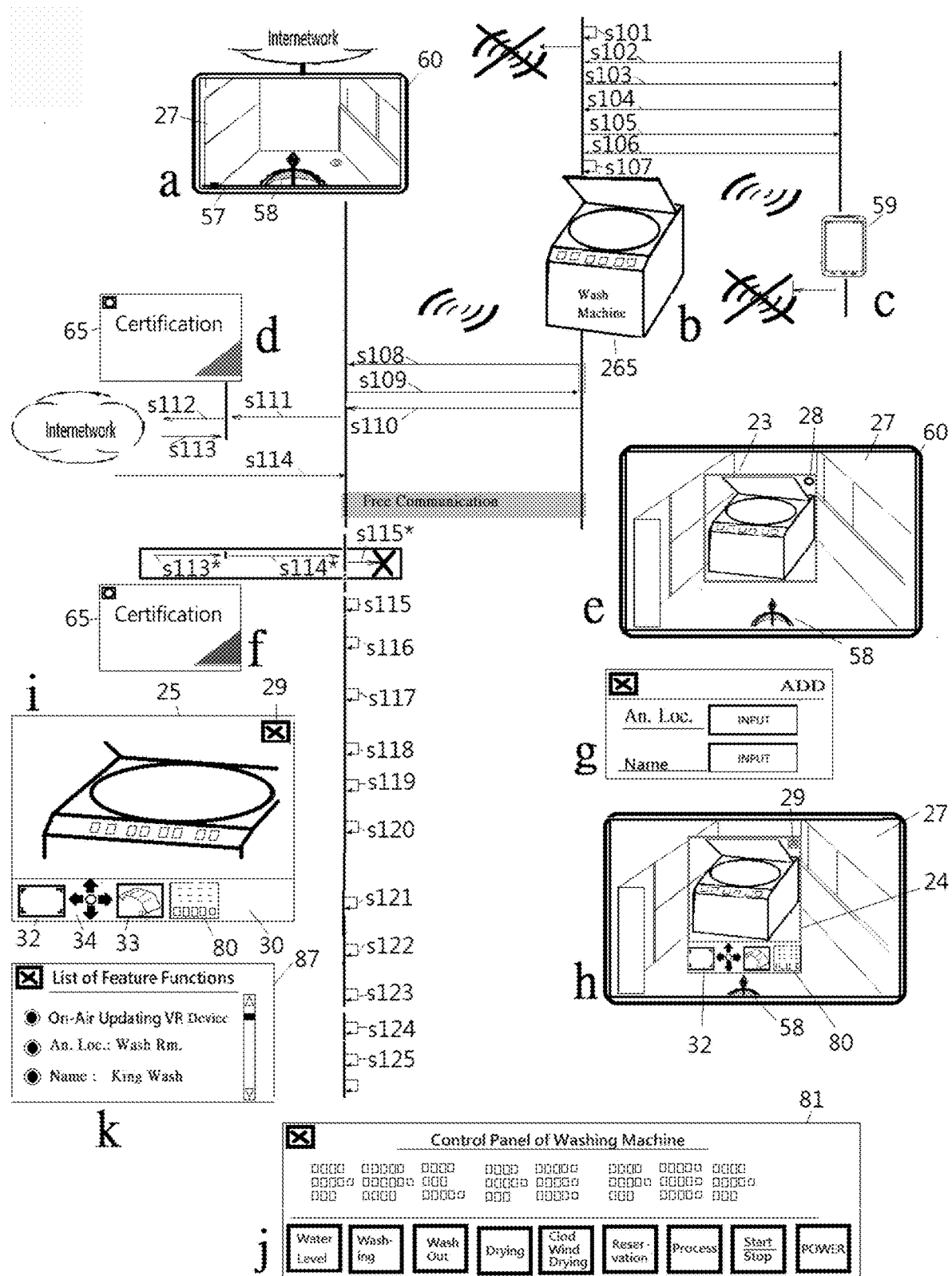
FIG. 4 shows the operating procedure of a plug-and-play target device (such as a washing machine target device 265) in washroom in accordance with the present invention.

With reference to FIG. 4 for the fourth embodiment 4 of the present invention, it shows the operating procedure of a plug-and-play target device (such as a washing machine target device 265) in wash room in accordance with the present invention 4, comprising a preceding pre-treatment (S101)~(S109), in which user uses a mobile phone to connect the target device 26 (such as a washing machine target device 265) and send a SSID and a PASSWORD of the main control device 60 to the target device 26, and then soft reset the washing machine target device 265 to let the washing machine target device 265 login to the main control device 60 automatically by the (SSID and PASSWORD) information; the steps (S101)~(S109) can be pre-processed before the sales attendant delivers the product to the house.

FIG. 4a shows a main control device 60 on which has already guided the virtual navigation mark 58 to tour to the doorway of the washing room, but the installation procedures have not started yet. FIG. 4b shows a washing machine target device 265 to be installed. FIG. 4c shows a mobile phone. FIG. 4d shows the target device safety certification virtual tool 65. In the beginning, the washing machine target device 265 in a server mode (through a Hard Reset) cannot be connected to the main control device 60; but the mobile phone can login to a (software) server of the washing machine target device 265 according to the instructions provided by a user' guide of the washing machine target device 265.

Firstly, the virtual navigation mark 58 (also known as an emulated arrow man) is guided to the doorway of the washing room (wherein FIG. 4a indicates that the main control device 60 has shown the virtual navigation mark 58 and the washing room scene), and the procedure comprises the following steps. (S101): Power on and/or Hard Reset the washing machine target device 265 to a server mode; (S102): Use the mobile phone to login to the Server of the washing machine target device 265 by a person according the user guide of the production (the washing machine target device 265); (S103): the mobile phone receives a "connected!" message from the server, (S104): Send the SSID and PASSWORD of the main control device 60 into the washing machine target device 265 by using the mobile phone; (S105): Receive the "received" message from the Server by the mobile phone; (S106): Send a "SoftReset Command" to the Server by the mobile phone; (S107): to reset the washing machine target device 265 into a client mode; (S108): the washing machine target device 265 searches the "SSID" server and then uses the "PASSWORD" to automatically log in to "SSID", the main control device 60; and (S109): the washing machine target device 265 receives a "Connected. OK" message from the main control device 60. Until now, the washing machine target device 265 is in the client mode and has connected to the main control device 60.

Thereafter, the network certification and operation procedure comprises the following steps. (S110): Send a security number transmitted from the washing machine target device 265 to a receiving unit of the main control device 60; (S111): Forward the security number to the target device safety certification virtual tool 65 by the main control device 60 for a preliminary inspection; (S112): Forward the security number to a certification center (not labelled) by the target device safety certification virtual tool 65 for a certification; (S113): Receive a successful certification (the target device safety certification virtual tool 65 indicates a triangle in green color) by the main control device 60 and a permission of downloading the virtual device compressed information package 22; (S114): Successfully download the virtual device compress information package 22 from a vendor's server 96; (S115): Successfully decompress the virtual device compressed information package 22, and successfully put the washing machine virtual device 215 into the washing room in the 3D scene map 27, and display the washing machine virtual device 215 in form of a normal sized virtual device 23 as shown in FIG. 4e.

In the path of a failed certification (S113*, S114*) the main control device 60 receives a failed certification (the main control device 60 indicates a triangle in red color) as shown in FIG. 4f (S115*): The main control device 60 disconnects the transmission from the target device 26 to the receiving unit of the main control device 60.

(S116): Click a right button of a mouse to move, set, or anchor the washing machine virtual device 215; (S117): Anchor and lock the virtual device 21 in the 3D scene map 27; (S118): Input an anchorage location name (Wash Rm.) and a machine name (King Wash) as shown in FIG. 4g; (S119): Complete the installation of the washing machine target device 265; (S120): Operate freely hereafter the successful Power-on and log in.

(S121): Click to select the circle button object 28 at the upper right corner of the virtual device 21, and then display the enlarged virtual device 24 (of washing machine target device 265) (Please see FIG. 4h); (S122): Click to select the full screen virtual device SBO button 32 to display the full screen virtual device 25 (of washing machine target device 265) as shown in FIG. 4i.

In FIG. 4i, (S123): Click on the control panel SBO button 80 on the hidden-able control operating area 30, and an emulated remote control panel VR tool 81 of washing machine virtual device 215 be opened, as shown FIG. 4*j*, and then (S124): the user is more intelligent operating on the emulated remote control panel VR tool 81; (S125): If the emulation programs management SBO button 33 is clicked to carry out the program management operation of the virtual device in emulation program package 36, the user will see "An. Loc.: Wash Rm." and "Name: King Wash" as shown in FIG. 4*k*.

The aforementioned standard procedure of the plug-and-play target device 26 is the most critical technology contributing to the success of the IoT integration platform.

The present invention further discloses users sharing privilege design of the 3D scene map 27, and there are four levels of the privilege including Creator, Owner, Creator &Owner, and Group Member, wherein the creator is a designer who creates the 3D scene map 27 and capable of deleting, editing, and modifying the content (including the installation of which virtual objects (virtual tools are also included) with special functions and the installation of which target devices), and the owner is the asset manager of the 3D scene map 27 having the right of deciding who is the creator and who is the group member, and the group member just has the right to share and use the 3D scene map 27.

Figure 5:
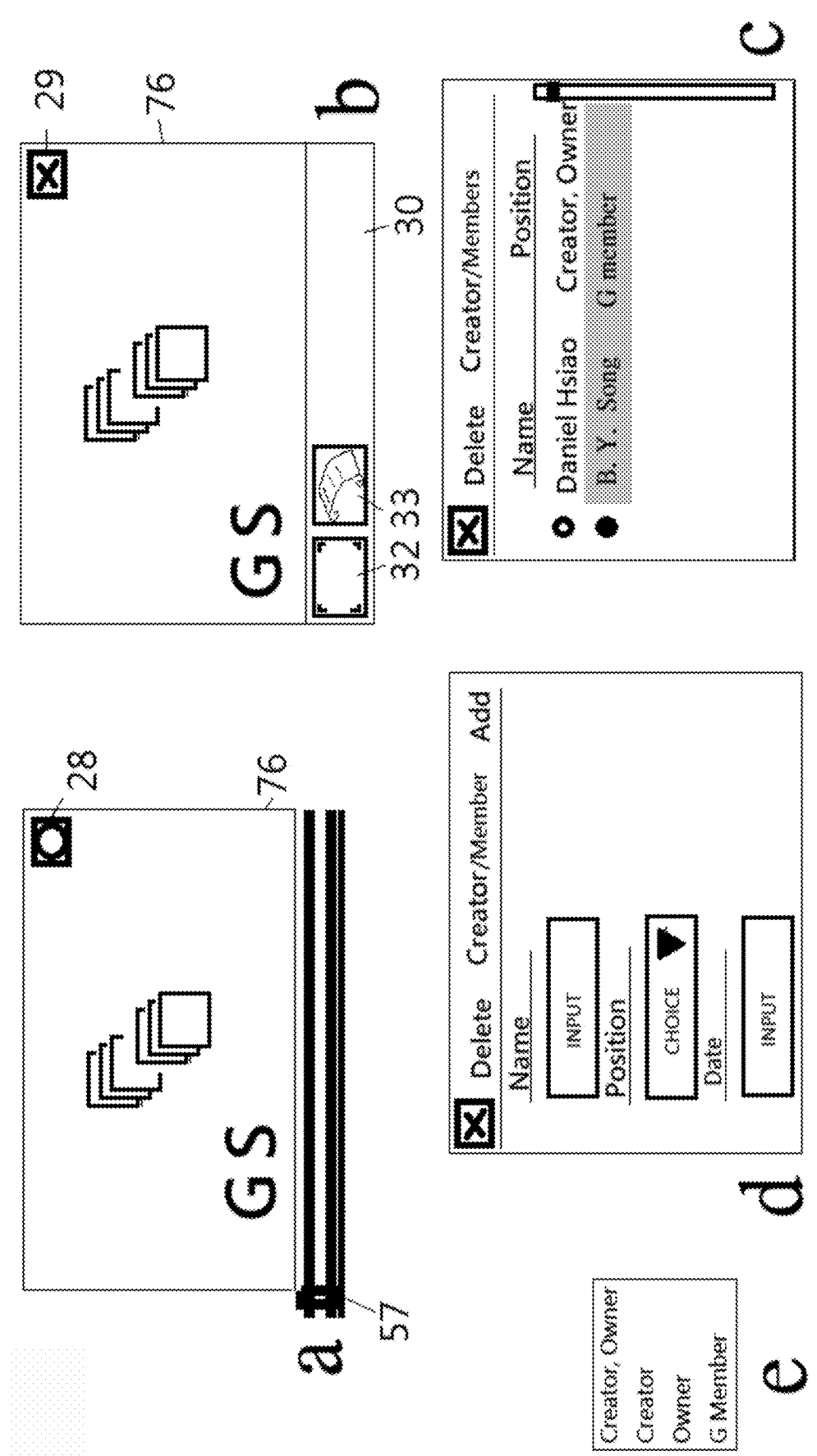
FIG. 5 shows the user sharing definition of a 3D scene map in accordance with the present invention.

With reference to FIG. 5 for the fifth embodiment of the present invention, this embodiment shows the user sharing definition of a 3D scene map in accordance with the present invention 5;

An owner (or creator) uses GS VR Tool 76 to set the user sharing usage privilege of the 3D scene map 27. As shown in FIG. 5*a*, the GS VR Tool 76 is searched from the slider 57; and then the circle button object 28 is clicked to open its enlarged virtual tool 66, as shown in FIG. 5*b*.

In FIG. 5*b*, the middle of the GS VR Tool 76 is clicked to open a creator/member inspecting window as shown in FIG. 5*c*.

In FIG. 5*c*, a right slider in the inspecting window is provided for facilitating users to browse; after a member is selected with a click; then the Delete label can be clicked to delete the member. If the GS is clicked, the creator/member adding window will be opened as shown in FIG. 5*d*.

In FIG. 5*d*, a name is filled in the name column; a class of privilege level is selected in the identity column of which there are four choices (including Creator, Owner, Creator & Owner, G Member) as shown in FIG. 5*e*; an establishing date is filled in the date column; then Add is clicked to add; and finally the close button object 29 is clicked to close the GS VR Tool 76; in FIG. 5*b* further has a full screen virtual device SBO button 32 and an emulation programs management SBO button 33 (more detail description in the operation method of the first embodiment and the fourth embodiment respectively).

Figure 6:
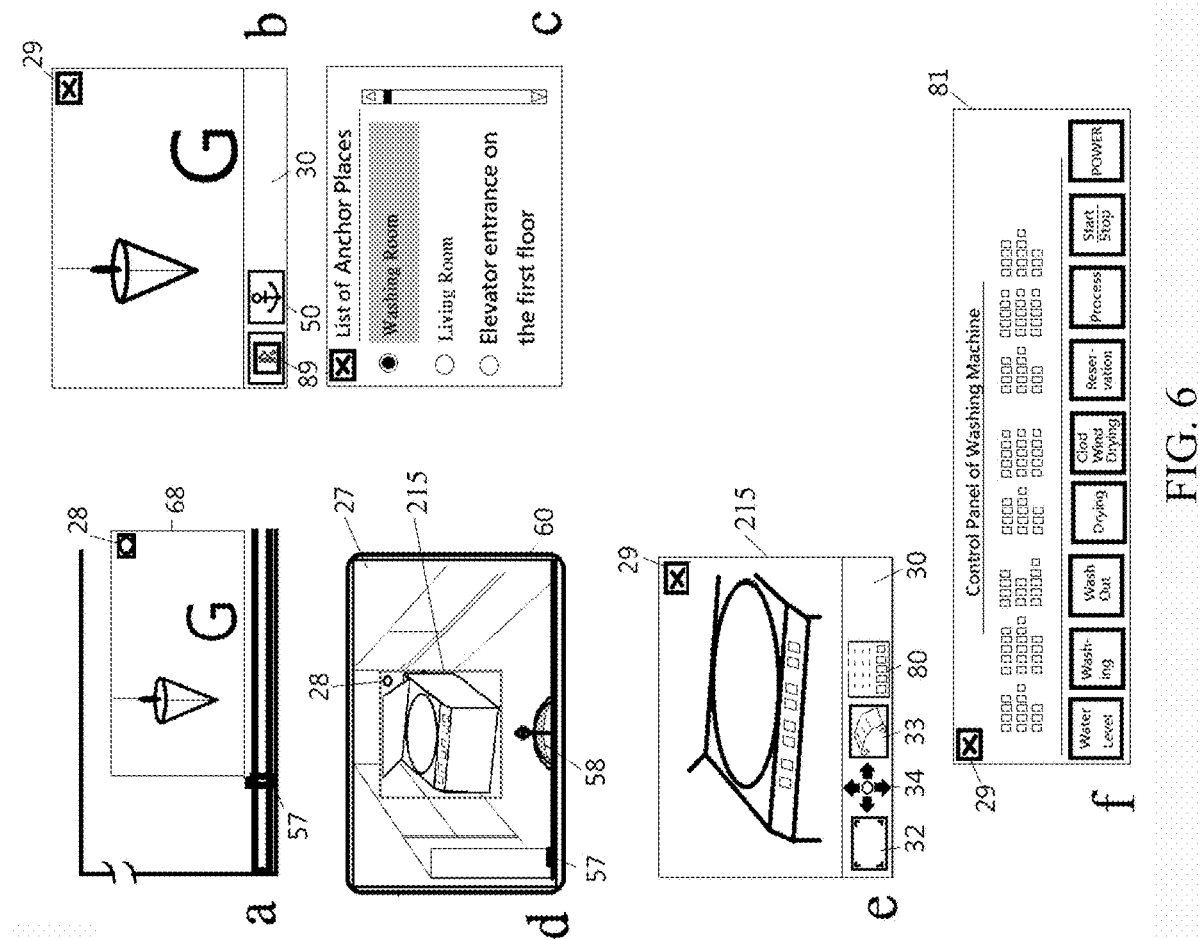
FIG. 6 shows a quick search, an operation, and a status observation of a virtual device status in a 3D scene map in accordance with the present invention.

With reference to FIG. 6 for the sixth embodiment of the present invention, this embodiment shows a quick search, an operation, and a status observation of a virtual device in a 3D scene map 27 in accordance with the present invention 6;

Assuming that a King washing has been installed in a washing room on the second floor in the 3D scene map 27, the procedure comprises the steps of looking for the quick positioning marker generator virtual tool 68 on the slider 57 as shown in FIG. 6*a*.

In FIG. 6*a*, the circle button object 28 is clicked to open the quick positioning marker generator virtual tool 68 in an enlarged virtual tool 66 mode as shown in FIG. 6*b*.

In FIG. 6*b*, the list anchors SBO Button 50 is clicked. In FIG. 6*c*, a window object has been opened and all anchor places of the 3D scene map 27 are listed there.

In FIG. 6*c*, one of the places (such as the washing room) is clicked to select.

In FIG. 6*d*, a main control device 60 discloses that a user has arrived at the washing room quickly and the washing machine virtual device 215 appears on the right in front of you on the controlling and displaying interface 54, and then the washing machine virtual device 215 is opened in the enlarged virtual device 24 mode as shown in FIG. 6*e*.

In FIG. 6*e*, the control panel SBO button 80 is clicked to open an emulated remote control panel VR tool 81 of washing machine virtual device 215 as shown in FIG. 6*f*.

Figure 7:
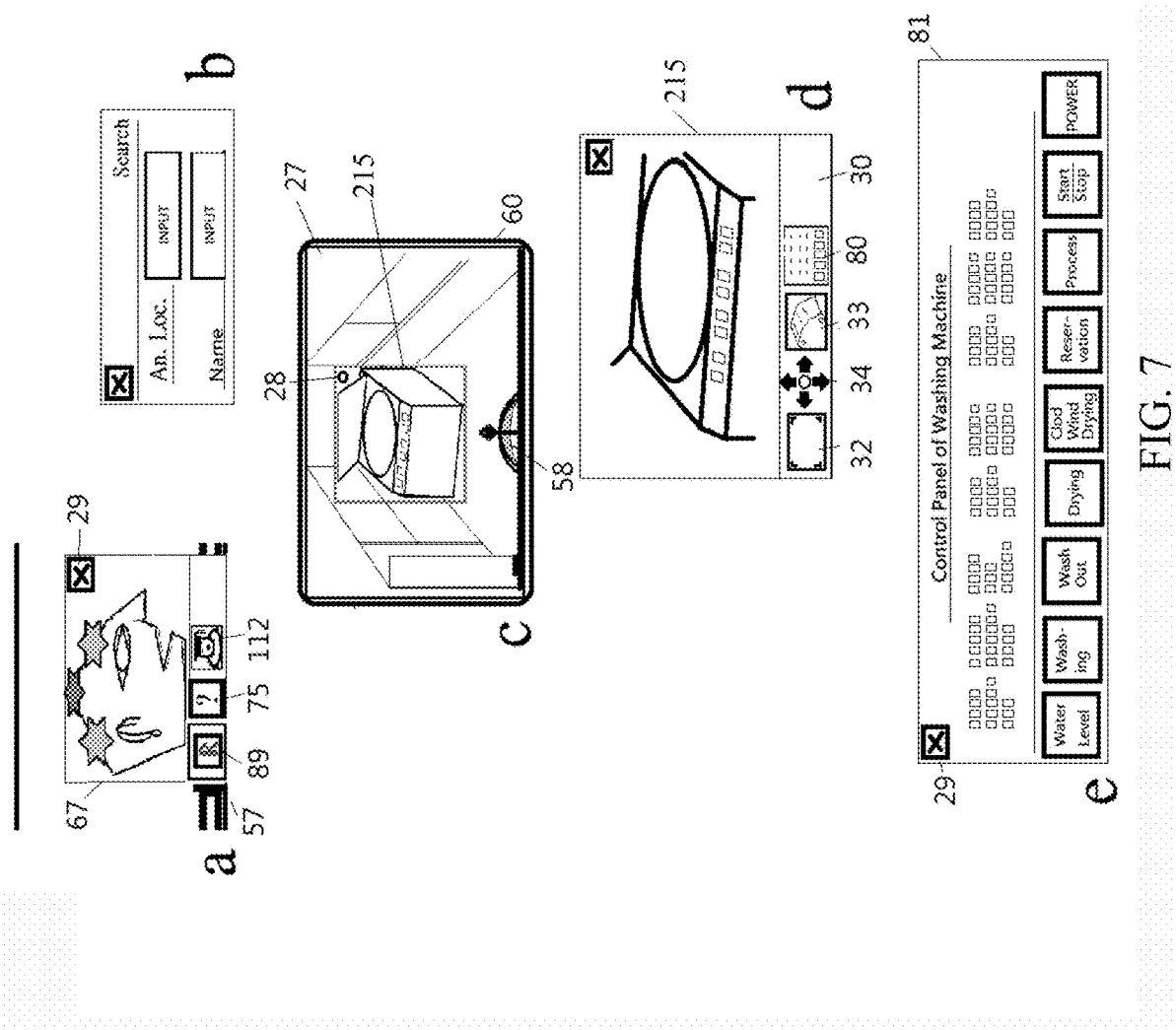
FIG. 7 shows another quick search, an operation, and a status observation of a virtual device status in a 3D scene map in accordance with the present invention.

In FIG. 6*f*, a user freely operates on the control panel, and finally closes the emulated remote control panel VR tool 81 of the washing machine virtual device 215;

With reference to FIG. 7 for the seventh embodiment of the present invention, this embodiment described another method for the quick search, operation, and status observation of the virtual device 21 in a 3D scene map 27 in the present invention 7 (wherein the assumptions of this embodiment are the same as the assumptions of the sixth embodiment).

The procedure comprises the steps of: (1) Search the smart housekeeper virtual tool 67 on the slider 57, and open it in enlarged virtual tool 66 mode as shown in FIG. 7*a*; (2) Click question mark SBO button 75 in the hidden-able control operating area 30 to launch an AOP procedure 51, and a dialog window object will be opened as shown in FIG. 7*b*. In FIG. 7*b*, the data of (washing room, King washing room) of the washing machine virtual device 215 is typed into an input box of the dialog window object to request the smart housekeeper virtual tool 67 (also known as the house Elf VR Tool 67) to search for the installed location of the virtual device 21 and transposition arriving there quickly. The Search label is clicked to start searching. In FIG. 7*c*, a main control device 60 indicates that the user is quickly located in the washing room in the 3D scene map; and then the user can click the circle button object 28 to open its enlarged virtual device 24 of the washing machine virtual device 215 as shown FIG. 7*d*. In FIG. 7*d*, the control panel SBO button 80 is clicked to open the emulated remote control panel VR tool 81 of the washing machine virtual device 215 as shown in FIG. 7*e*; in FIG. 7*e*, the user can free control operations on the emulated remote control panel VR tool 81, and finally close the emulated remote control panel VR tool 81 of the washing machine virtual device 215;

In the seventh embodiment, the emulated remote control panel virtual tool 81 is also disclosed and provided for achieving a convenient and intelligent control of the IoT home appliances (and can cooperate with a status message push notification (such as the "Clothes Washed done" message push notification)), and a virtual device push notification settings will be described in the eleventh embodiment below.

Figure 8:
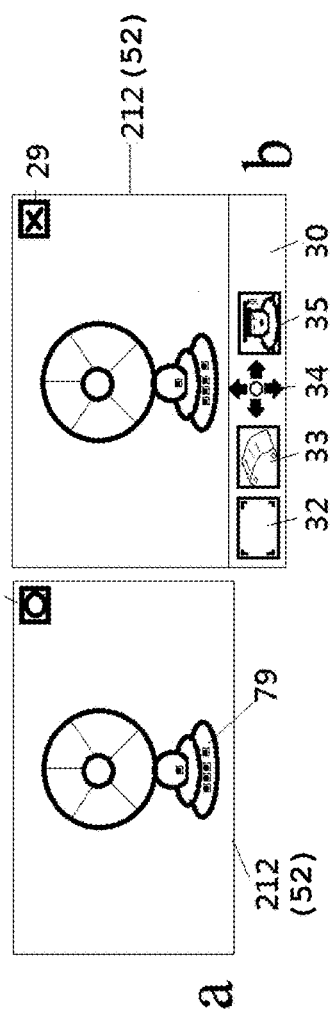
FIG. 8 shows an intelligent control settings SBO button disposed on a hidden-able control operating area of a virtual device to implement expanding an intelligent control settings function in accordance with the present invention.

With reference to FIG. 8 for the eighth embodiment of the present invention, this embodiment uses an intelligent control settings SBO button 35 on a hidden-able control operating area 30 of a virtual device 21 to achieve the expansion of an intelligent control function 8;

In a 3D scene map 27 of this embodiment, an electric fan virtual device 212 is used as an example for the illustration, wherein an intelligent control settings SBO button 35 is clicked to start an AOP procedure 51, which implements a complex intelligent condition of control operation to further improve the intelligent ability of the 3D scene map 27, and its procedure comprises the step substantially same as the aforementioned quick search method to find out the virtual device 21 (which is a Fat Fan virtual device 212) as shown FIG. 8*a*. The circle button object 28 in FIG. 8*a* is clicked to open it as an enlarged virtual device 24 of the Fat Fan virtual device 212 as shown in FIG. 8*b*.

In FIG. 8*b*, the intelligent control settings SBO button 35 is clicked to open an operating window object as shown in FIG. 8*c*.

In FIG. 8*c*, an operation window object shows that the intelligent control conditions (including the complex parameter conditions exporting from other virtual devices 21 and then integrating by importing in) have been set. The right slider in the window can be slid to assist the observation, and one of the options is clicked by the user and then the Delete label is clicked to delete the intelligent control condition and action combination. Or, the Add label may be clicked to enter into a new intelligent control condition/action to add and to set as shown in FIG. 8*d*.

In FIG. 8*d*, a dialog window object appears. An intelligent control condition is selected in the condition column, and the selectable intelligent control conditions include the options of (Temp. >, Temp.> & T(Clock)=, T(Clock) as shown FIG. 8*e*). A numerical value of the intelligent control condition is entered into the numerical value column, and an operation is selected in the operation column, wherein the selectable operations include the options of (Off, G1, G2, G3, G1+S, G2+S, G3+S, etc. as shown FIG. 8*f*, wherein G1, G2, and G3 are three stages of the wind speed level control, and S is a Fat Fan virtual device 212 swing control). The Add label is then clicked to add a new intelligent control condition and action combination, so as to complete the new setup. Finally, the enlarged virtual device 24 of the Fat Fan is closed.

In the eighth embodiment, a target device 26 can add and set a combination of complex conditions and control action easily by an AOP procedure 51 of the corresponding virtual device 21 to enhance the intelligent control ability (of which the target device 26 does not have originally).

Figure 9:
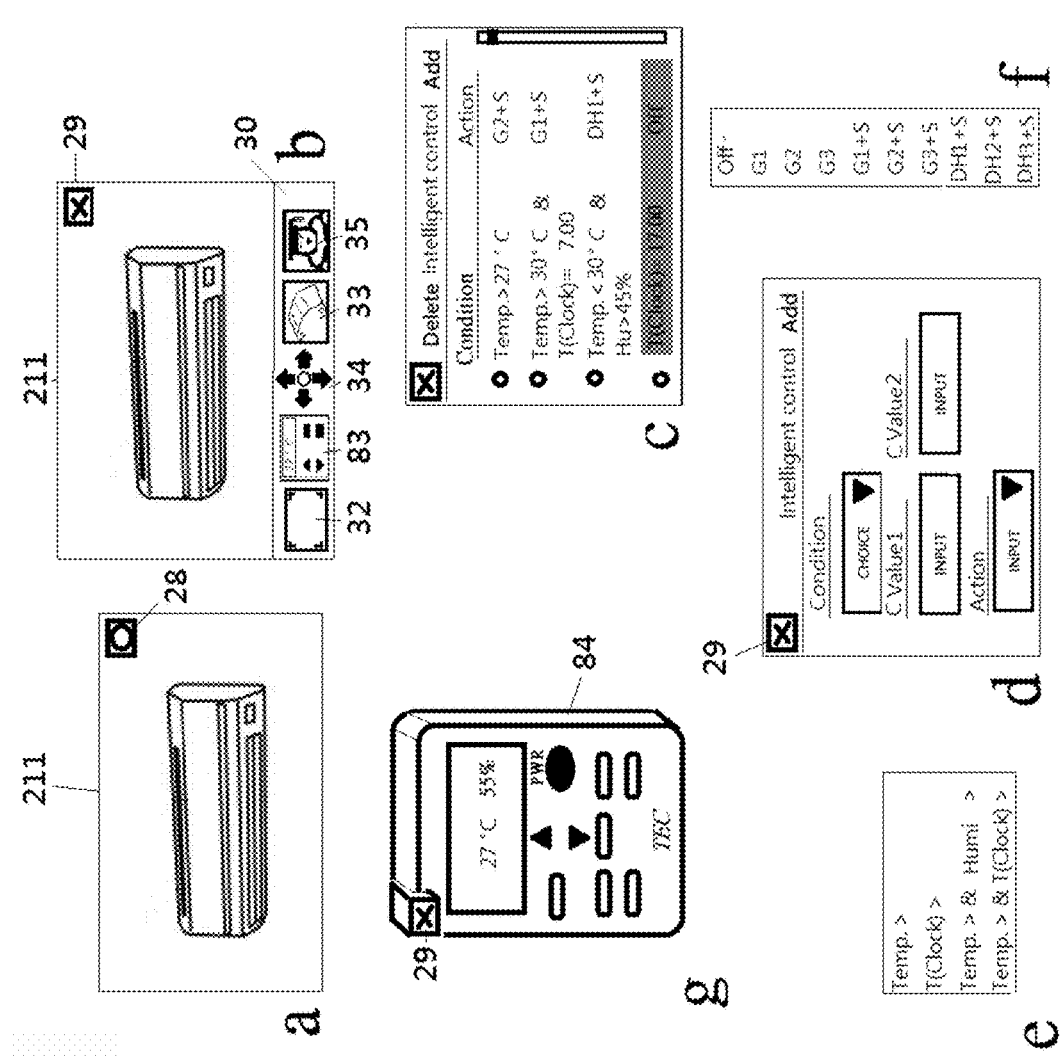
FIG. 9 shows a remote control SBO button disposed on a hidden-able control operating area of a virtual device for carrying out an air-conditioner remote control method in real life in accordance with the present invention.

With reference to FIG. 9 for the ninth embodiment of the present invention, a Remote Control SBO button 83 on a hidden-able control operating area 30 of a virtual device 21 is provided for achieving the air-conditioner remote control method in real life 9.

In this embodiment, an air-conditioner virtual device 211 is used as an example for the illustration. A remote control SBO button 83 on the hidden-able control operating area 30 can be used to achieve the detailed remote control of an air-conditioner virtual device 211 in real life, and an intelligent control settings SBO button 35 is used to achieve the complex intelligent condition control and operation, so as to further enhance the air-conditioner intelligent control ability, and its procedure is described as follows:

Firstly, as mentioned before, looking for the air-conditioner virtual device 211 and found.

In FIG. 9*a*, the circle button object 28 of the air-conditioner virtual device 211 is clicked and opened it as an enlarged virtual device 24 as shown in FIG. 9*b*.

In FIG. 9*b*, the intelligent control settings SBO button 35 is clicked to open an operating window object as shown in FIG. 9*c* and FIG. 9*d*.

In FIG. 9*c*, the intelligent control condition and action combination (including the complex parameter conditions and actions exporting from other virtual devices 21 and then integrated of importing in) have been listed out. One of the settings can be clicked, and then the Delete label can be clicked to delete the intelligent control condition and action combination, or the Add label is clicked to enter into a new combination of intelligent control condition and an action to add; FIG. 9*d* shows the setting procedure.

In FIG. 9*d*, a dialog window object appears. An intelligent control condition is selected in the control condition column, and the selectable intelligent control conditions include the options of (Temp. >, Temp.> & T(Clock)=, Temp.> & Humi.>, T(Clock)=) can be selected as shown in FIG. 9*e*). A numerical value of the intelligent control condition is entered into the numerical value column, and action including the options of (Off, G1, G2, G3, G1+S, G2+S, G3+S, DH1+S, DH2+S, DH3+S) can be selected as shown in FIG. 9*f*, wherein G1, G2, and G3 are three stages of wind speed control level, and S is swing control, and DH1, DH2, and DH3 are dehumidification control levels of the air-conditioner virtual device 211). The Add label is clicked to set and add a new intelligent control condition and a new action combination.

In FIG. 9*b*, the remote control SBO button 83 is clicked, and an emulated remote control device virtual tool 84 is then opened as shown in FIG. 9*g*.

In FIG. 9*g*, an emulated remote control device virtual tool 84 appears. On the emulated remote control device virtual tool 84, a user starts a remote control operation on the emulator (It is just like an operation at home). When the close button object 29 is clicked, the emulated remote control device virtual tool 84 will be closed. Finally, the enlarged virtual device 24 (which is an air-conditioner) is closed.

As described above, the emulated remote control device virtual tool 84 is provided for easily controlling an air-conditioner from a remote end, and the air-conditioner intelligent control ability (such as the previous embodiment that uses the temperature and humidity conditions or the temperature and time conditions for the setting) is enhanced.

Figure 10:
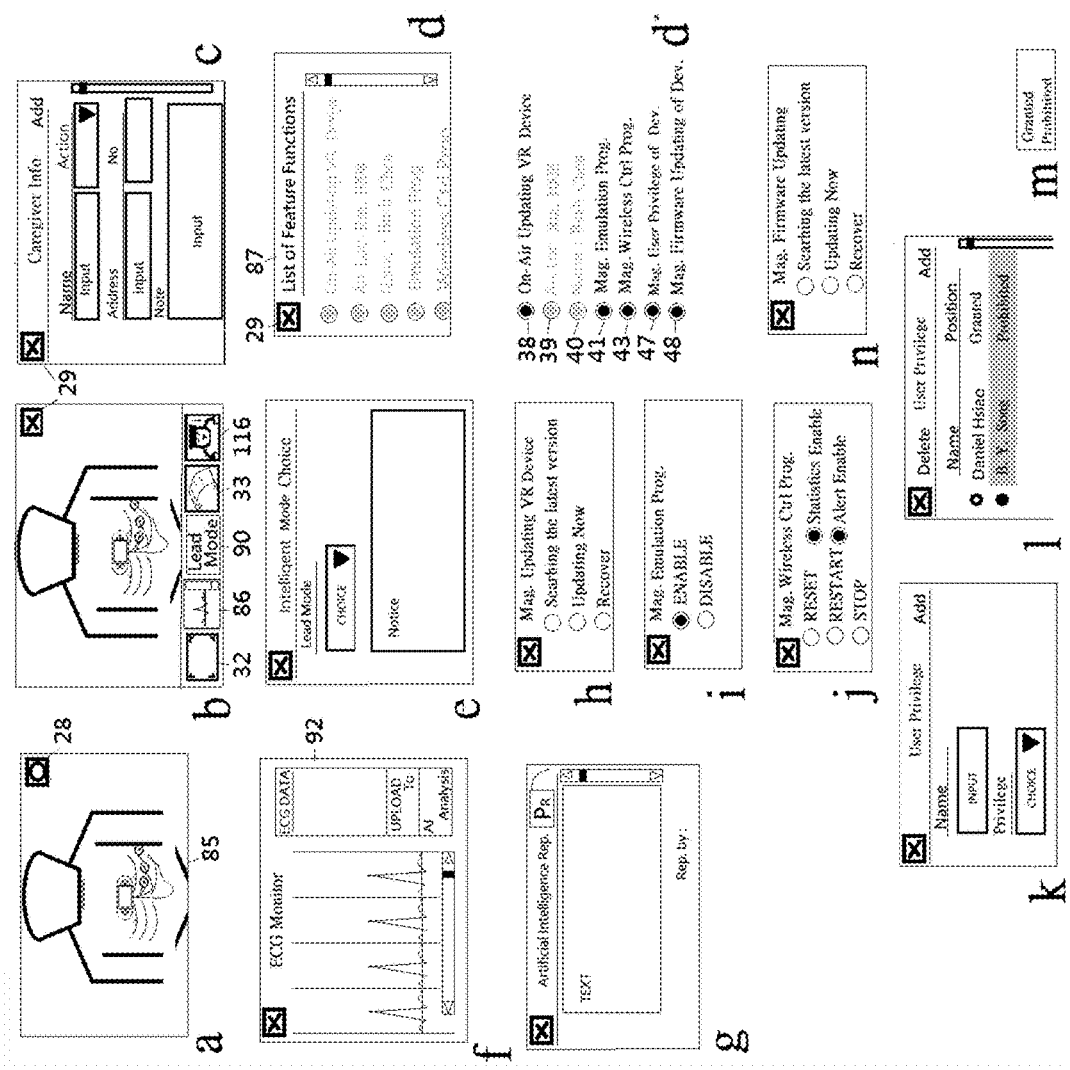
FIG. 10 shows a wearable virtual device 85 in a 3D scene map by expanding a virtual monitor to carry out an artificial intelligence function in accordance with the present invention.

With reference to FIG. 10 for the tenth embodiment of the present invention, this embodiment discloses a wearable virtual device 85 in a 3D scene map for expanding a virtual monitor to achieve an artificial intelligence function 10. In this embodiment, a wearable virtual device 85 is used as an example to illustrate the present invention, to demonstrate the innovation of an AOP procedure 51, and a WECG virtual monitor 92 is used for expanding the artificial intelligence integration operation function.

Firstly, a WECG virtual device 213 is found according to the aforementioned quick search method as shown in FIG. 10*a*.

In FIG. 10*a*, the circle button object 28 is clicked to open the enlarged virtual device 24 of the WECG virtual device 213 as shown in FIG. 10*b*.

In FIG. 10*b*, the caregiver information SBO button 116 is clicked to open a data filling window object as shown in FIG. 10*c*.

In FIG. 10*c*, the data are filled, and then the Add label is clicked to add the filled information.

In FIG. 10*b*, an emulation programs management SBO button 33 is clicked to open an emulation program management list window 87 as shown in FIG. 10*d*, but the words in grey color in the list indicate that the login person has no administrative rights of the virtual device 21. If any word in black color appears in FIG. 10*d**, then the login person has the administrative rights for the following management and operation:

(i) on-air updating VR device 38 has management options including (Searching the Latest version, Updating now, and Recovering) as shown FIG. 10*h*.

(ii) mag. emulation prog. 41 management option has (ENABLE and DISABLE) as shown FIG. 10*i*.

(iii) mag. wireless control prog. 43 management option has the options of (RESET, RESTART, STOP, and Statistics Enable (Default Enable), and Alert Enable (Default Enable)) as shown in FIG. 10*j*.

(iv) mag. user privilege of dev. 47 for launching the AOP procedure 51 has the options of (Select a user, Delete the user; Click Add to start adding a new user; In Name Box input the name of user; and In Privilege Box choice the privilege of user). FIG. 10*m* shows the privilege choices of the user (Granted or Prohibited). In FIG. 10*l*, the Add Label is clicked to add the user.

(v) mag. firmware updating of dev. 48 management option has the options of (Searching the Latest version, Updating now, and Recover) as shown in FIG. 10*n*, In FIG. 10*b*, the lead mode SBO Button 90 is clicked to open an intelligent lead mode choice window 91 as shown in FIG. 10*e*, and one lead mode of the wearable virtual device 85 is selected to operate on the WECG.

In FIG. 10*b*, the WECG virtual monitor SBO Button 86 is clicked to open a WECG virtual monitor 92 as shown in FIG. 10*f* and start the monitoring process.

In FIG. 10*f*, a slider is provided for helping users to view an ECG wave. The ECG real-time data are shown in the upper right area. In the middle right area, a section of ECG data is uploaded to some place or somebody. The right bottom area is clicked to send an ECG waveform for an AI analysis.

In FIG. 10*g*, an AI report is received. A printer symbol is clicked to print out the AI report.

If the option "Prohibited" in the privilege choice column of a user (as shown FIG. 10*k*) is selected, the logged-in user will see the circle button object 28 in grey color, indicating that the user cannot open the enlarged virtual device 24 for further operations, since this user (without authorization) is prohibited from use.

For (iii) mag. wireless control prog. 43 management option Statistics Enable (Default Enable) and Alert Enable (Default Enable) of the tenth embodiment, the amount of incoming and outgoing communications of the virtual device 21 can be used for daily statistics, and a 5-day moving average is used for the analysis. If the amount of daily incoming or outgoing communications is greater than 1.5 times of the 5-day moving average, then an Alert is issued immediately to prevent the virtual device 21 from being attacked by network or becoming a Zombie node, so as to enhance the network security.

This embodiment also discloses that the target device 26 (which is a wearable device without an integrated ECG monitor display screen) can easily expand its display ability and data analysis ability (such as AI analysis) through the wearable ECG virtual device 213 to increase and improve the value of the target device 26.

In this embodiment, manufacturers can base on the advanced AOP procedure 51 to continuously introduce new versions of the virtual device compressed information package 22. When a user powers off the target device 26 and then powers on the target device 26 again, the latest version of the virtual device compressed information package 22 can be requested to reload, and this function gradually enhances the virtual device compressed information package 22 by each reload. This embodiment also discloses the usage privilege setting procedure of the virtual device 21 (Please refer to (vi) mag. user privilege of dev. 47).

The platform of the present invention promotes the good implementation, convenient use, and integrated artificial intelligence to the IoT for remote care, home care, or elderly care.

Figure 11:
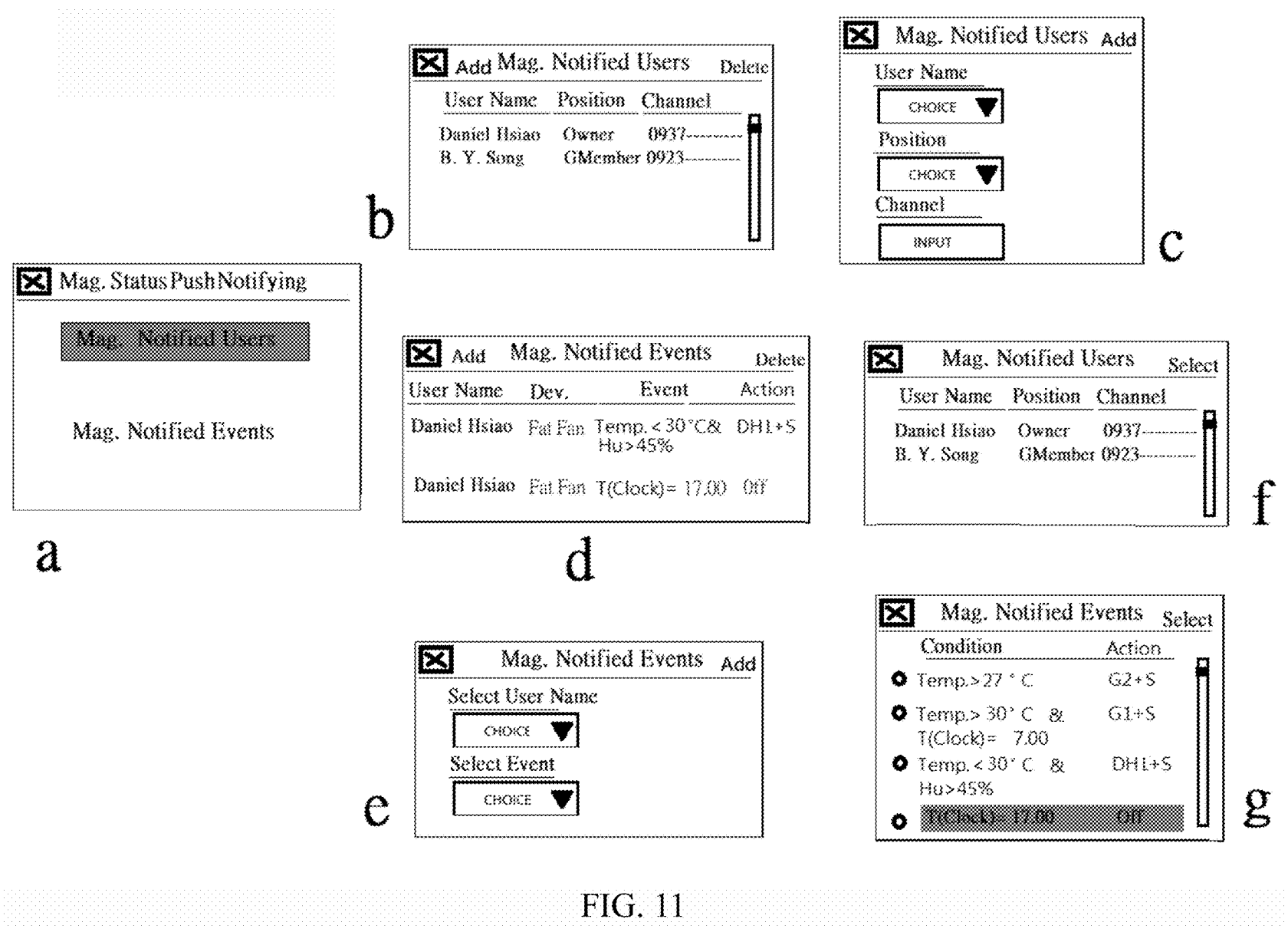

With reference to FIG. 11 for the eleventh embodiment 11, this embodiment discloses a status push notification setting AOP procedure 51 of a virtual device 21 in a 3D scene map 27 with the present invention 11.

Firstly, the virtual device 21 (which is an electric fan virtual device 212 in this embodiment) must be found, and then open the virtual device 21 as an enlarged virtual device 24, and open an emulation program management list window 87 from the enlarged virtual device 24 (after clicking the emulation programs management SBO button 33), and then the mag. status push notification of dev. 44 is clicked to open the corresponding AOP procedure 51 as shown in FIG. 11*a*.

In FIG. 11*a*, there are two entrances list there, when the mag. notified users entrance is clicked to open an associated window object as shown in FIG. 11*b*.

In FIG. 11*b*, after a user is browsed or selected, the Delete label can be clicked to delete the user, or the Add label is clicked to open another associated window object as shown in FIG. 11*c* in order to add a user (who must be an authorized user).

In FIG. 11*c*, the User Name column is provided for selecting a User Name, the Position column is provided for selecting an identity, and the Channel column is provided for inputting a mobile phone number of the user. The Add Label is clicked to add the new user.

In FIG. 11*a*, when another mag. notified event entrance is clicked to open an associated window object as shown in FIG. 11*d*.

In FIG. 11*d*, an event is browsed or selected by clicking, and then the Delete label is clicked to delete the Event, or the Add Label is clicked to open the next associated window object as shown in FIG. 11*e* in order to add a push event.

In FIG. 11*e*, the Select User Name column is clicked to open the menu as shown in FIG. 11*f*, and then a User Name is selected in FIG. 11*f* and finally, the Select Label is clicked to complete the selection of the User Name.

In FIG. 11*e*, the Select Event column is clicked to open the menu as shown in FIG. 11*g*, and then an event is selected, and finally, the Select Label is clicked to complete the selection of the event.

By such a simple procedure, we can easily complete the push notification setting of an event status message of a virtual device 21.

Figure 12:
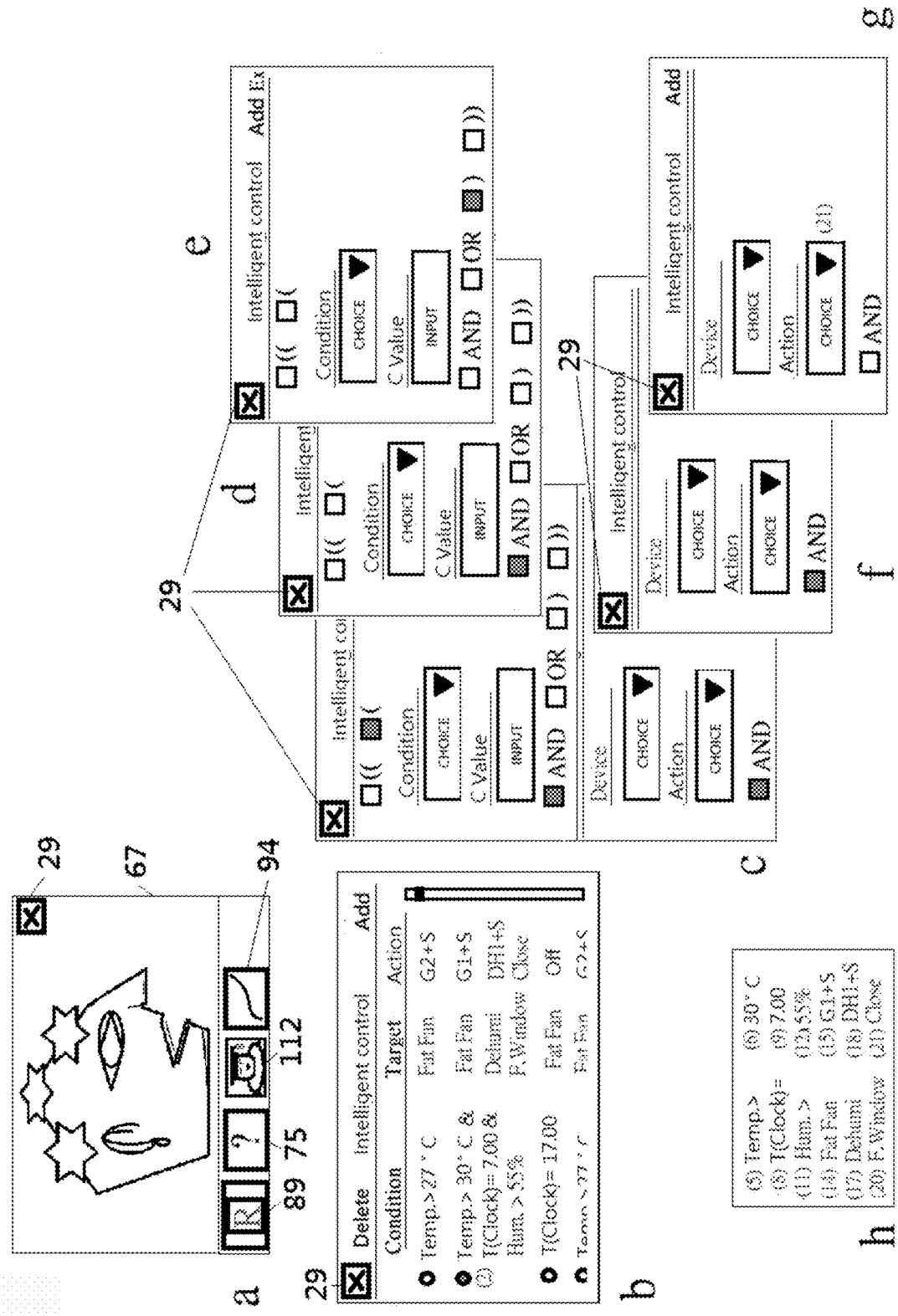
FIG. 12 shows the use of a smart housekeeper virtual tool in a 3D scene map to set a combination of a complex parameter intelligent conditional expression and launched an intelligent control in accordance with the present invention.

With reference to FIG. 12 for the twelfth embodiment of the present invention, this embodiment discloses a smart housekeeper virtual tool 67 used in a 3D scene map for setting a complex parameter intelligent conditional expression and a launched intelligent control setting 12. When the complex parameter intelligent conditional expression is met, an intelligent control operation is launched.

This procedure comprises the steps of: finding the smart housekeeper virtual tool 67 on the slider 57; and opening the smart housekeeper virtual tool 67 in enlarged mode as shown in FIG. 12*a*.

In FIG. 12*a*, the housekeeping intelligent control settings SBO button 112 on the hidden-able control operating area 30 is clicked to open a corresponding AOP procedure 51 as shown in FIG. 12*b*, FIG. 12*c*, FIG. 12*d*, FIG. 12*e*, FIG. 12*f*, and FIG. 12*g*.

In FIG. 12*b*, after an option is clicked, and then the Delete label can be clicked to delete the option of the intelligent control setting, or the Add label is clicked to open an associated window object (also known as an Associated Operation Procedure) as shown FIG. 12*c*.

In FIG. 12*c*, eight items (including double right quotation mark, single right quotation mark, condition, C value, AND, OR, single left quotation mark, and double left quotation mark) in selecting window are used to complete the setting input of "(Temp.>30 &", since the AND item ticked (symbol & is generated) leads to open the next associated window object as shown FIG. 12d; in which the input content of Condition and C Value reference to FIG. 12h.

In FIG. 12d, the other eight items (including double right quotation mark, single right quotation mark, condition, C value, AND, OR, single left quotation mark, and double left quotation mark) in selecting window are again used to complete the setting input of "T(Clock)=7.00 &", since the AND item ticked (symbol & is generated again) will open the next associated window object again as shown FIG. 12e.

In FIG. 12e, the eight items (including double right quotation mark, single right quotation mark, condition, C value, AND, OR, single left quotation mark, and double left quotation mark) in selecting window are used to complete the setting input of "Hum.>55%)" (If the number of left quotation marks is equal to the number of the right quotation marks, then a next new associated window object will not be opened. If the numbers of left and right quotation marks are equal and the upper right Add Ex label is clicked, then a next new associated window object will be opened for continuing the input of unfinished logical operation conditions). Until now, the input of the complex parameter intelligent conditional expressions "(Temp.>30 & T(Clock)=7.00 & Hum.>55)" (representing that the temperature is higher than 30 degrees, the time is 7:00 am, and the humidity is greater than 55%) is completed; and immediately thereafter the lower half of the associated window object as shown in FIG. 12c is clicked to complete a heterogeneous linked intelligent control setting (for controlling devices of different properties under the same conditions), wherein three items (including Device, Action, and AND) in selecting window are used to Set Fat Fan to "G1+S &", wherein the AND item ticked leads to opening the next associated window object as shown FIG. 12f.

In FIG. 12f, the three items (including Device, Action, and AND) in selecting window are used to Set Dehumi to "DH1+S &", wherein the AND item ticked will lead to opening the next associated window object as shown FIG. 12g; in which the input content of Device and Action reference to FIG. 12h.

In FIG. 12g, the three items (including Device, Action, and AND) in selecting window are used to Set F. Window to close. Since the AND item is not ticked, therefore the next associated window object will not be opened.

Finally, the heterogeneous linked control setting is to Set Fat Fan to "G1+S & Set Dehumi to DH1+S & Close F. Window" (means the fan is set to the first speed grade and in the swing state, the dehumidifier is set to the first speed level and in wind direction changing state; and the front window is closed). After the complex parameter intelligent conditional expression setting and the heterogeneous intelligent control setting are completed, the Add label is clicked to add this setting, and then in reversing order as shown in FIGS. 12g, 12f, 12e, 12d, 12c, and 12b will be closed sequentially and automatically, and finally, the associated window object as shown in FIG. 12a is closed to complete the whole setting procedure; in FIG. 12a further has a question marker SBO button 75 and a route plan SBO button 94 (more detail description in the operation method of the second embodiment and the seventeenth embodiment respectively).

Since each virtual device 21 has its own (Name and location), therefore two homogeneous target devices 26 can be distinguished from each other and the complex parameter intelligent conditional expression setting and the heterogeneous intelligent control setting of this sort can be expanded to a hybrid (heterogeneous and homogeneous) linked intelligent control setting (such as several downlights in the living room can be turned on or off simultaneously or separately).

Figure 13:
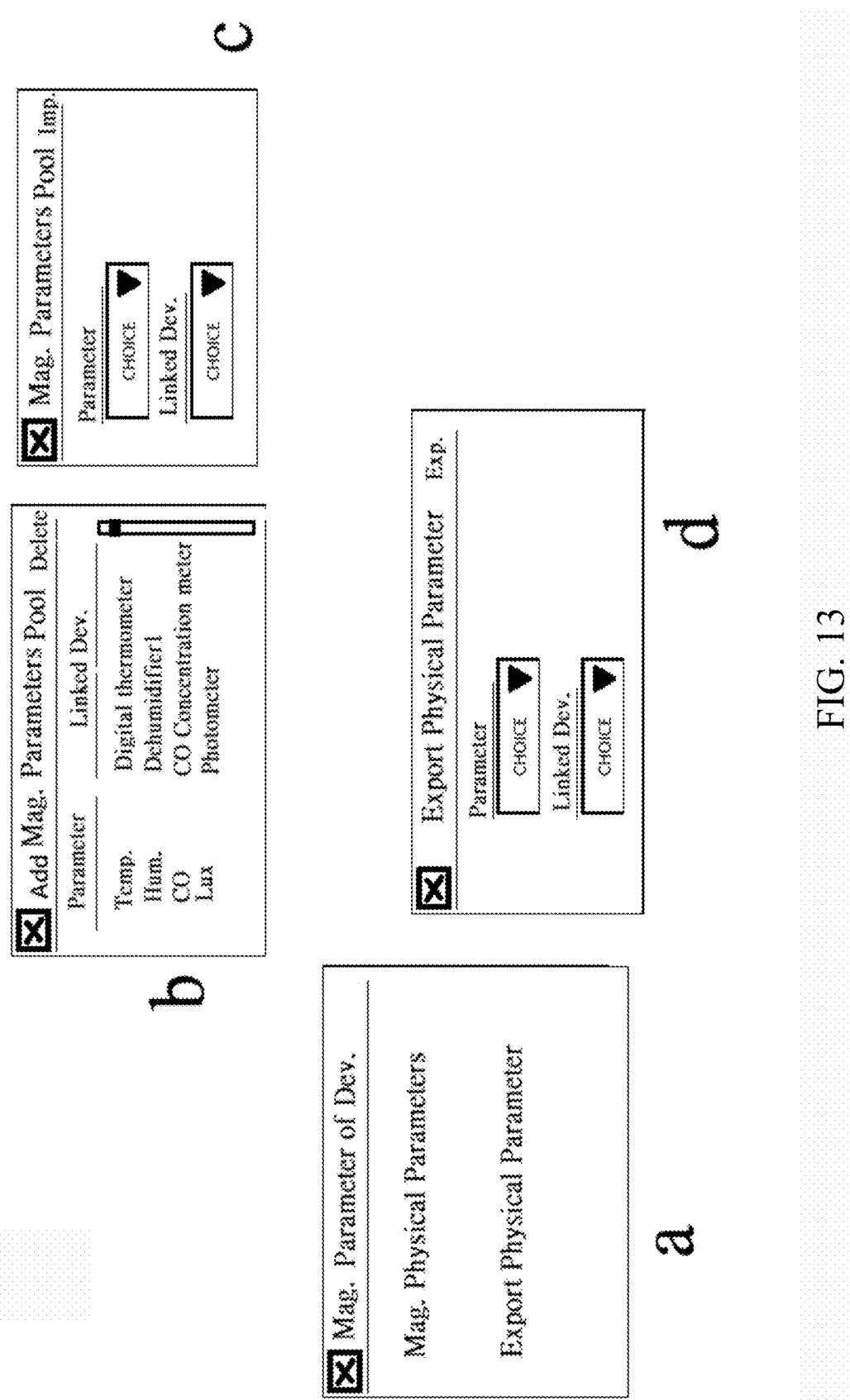
FIG. 13 shows a parameter management method of a 3D scene map in accordance with the present invention.

With reference to FIG. 13 for the thirteenth embodiment of the present invention, this embodiment discloses a parameter management method used in a 3D scene map in the present invention 13. From the previous embodiment, we can see that the more the physical parameters (such as temperature, humidity, gas concentration, etc.), the more the settable combination of complex parameter intelligent conditional expressions, and the higher the intelligence with. However, these physical parameters come from different virtual devices 21, so that a management method of these physical parameters is required. FIG. 13 shows a parameter management method, wherein a virtual device 21 is selected first, and its enlarged virtual device 24 is opened, and then the emulation programs management SBO button 33 is clicked, and the mag. parameters of dev. 45 in the emulation program management list window 87 is clicked to open a corresponding AOP procedure 51 starts from an associated window object as shown FIG. 13a.

In FIG. 13a, there are two entrances. When the mag. physical parameters entrance is clicked to open another associated window object, as shown in FIG. 13b.

In FIG. 13b, a physical parameter is browsed and selected, or the Delete label is clicked to delete the physical parameter, or the Add label is clicked to open another associated window object as shown in FIG. 13c for importing a parameter.

In FIG. 13c, Proximity is selected in the Parameter column, and linked device AMRON Proxier is selected in the Linked Dev. Column, and the Imp. label is clicked for importing this parameter.

There is another way. In FIG. 13a, the Export Physical Parameter entrance is clicked to open an associated window object as shown in FIG. 13d.

In FIG. 13d, Proximity is selected in the Parameter column, linked device AMRON Proxier is selected in the Linked Dev. column, and the Exp. label is clicked for the export, so as to achieve the same effect.

Figure 14:
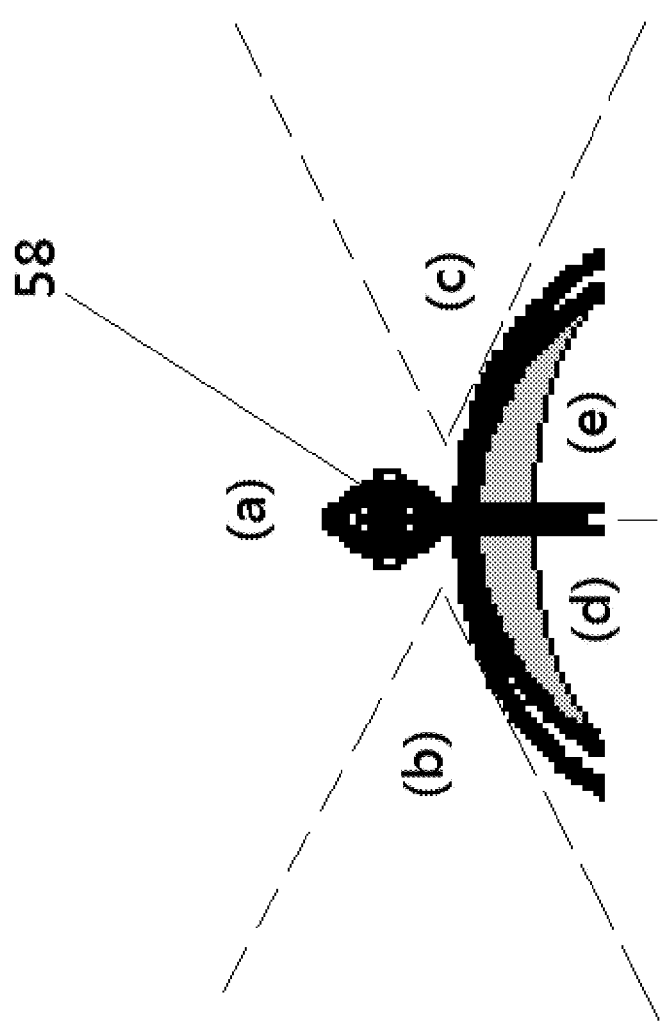
FIG. 14 is a schematic view showing a virtual navigation mark operating area in accordance with the present invention.

With reference to FIG. 14 for a schematic view of an operating area of a virtual navigation mark 58 in accordance with the fourteenth embodiment of the present invention 14, a mouse or a finger presses and drags on zone (a) to guide the virtual navigation mark 58 to move straight ahead, or presses zone (b) and hold to wait the virtual navigation mark 58 to turn left and stop and become the zone (a) and then drag it to move forward. If the user does not want to move forward, then the user only changes the viewing angle to the left. Pressing a zone (c) and hold to wait for the virtual navigation mark 58 to turn right and stop, and become the zone (a) and then drag it to move forward. If the user does not want to move forward, then the user can only changes the viewing angle to the right.

If the third embodiment is applied for setting a quick positioning marker virtual tool 69 in the 3D scene map 27, and then the embodiment 17 (which will be described below) is applied for designing a patrol route of the virtual navigation mark 58 in the 3D scene map 27 and forming an automatic guide patrol route of the virtual navigation mark 58. This will be the best tool for the users (particularly the scene map owner) who is eager to know about the status of all virtual devices 21 (corresponding to their respective target devices 26) in the 3D scene map 27. During the patrol, a user may press a zone (d). If there is a next station defined, then the user may immediately turn to the next station. The user may press a zone (e). If there is a previous station defined, then the user may immediately return to the previous station.

Figure 15:
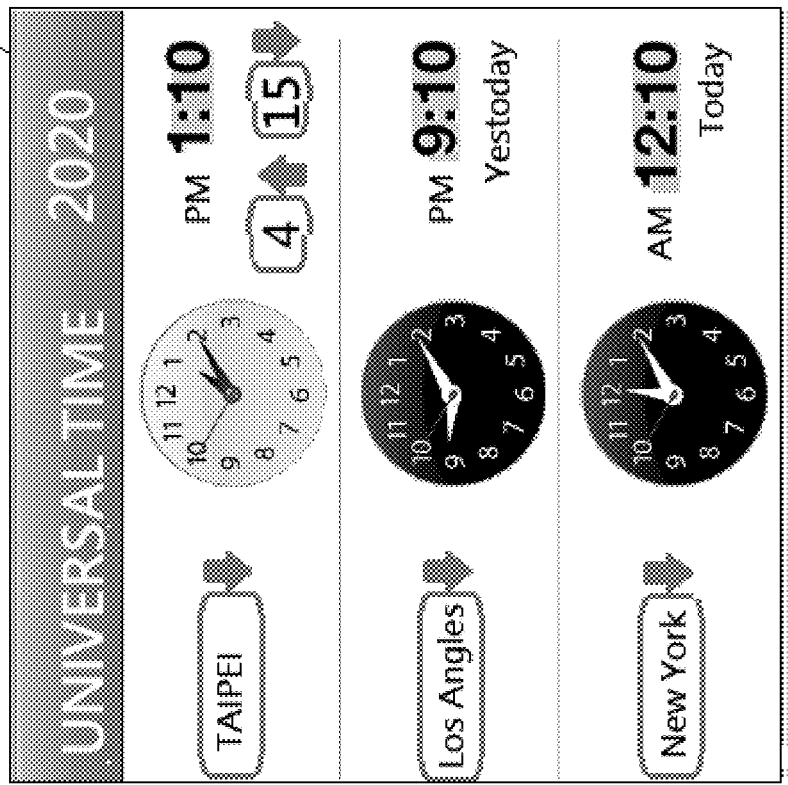
FIG. 15 shows a world time virtual tool for outputting a T(Country) public parameter in accordance with the present invention.

With reference to FIG. 15 for the fifteenth embodiment of the present invention, this embodiment discloses a world time virtual tool 72 for outputting a T(Country) public parameter as a time referenced basis for all controls 15 in the 3D scene map 27.

A main time zone (which is the time zone of the location of the 3D scene map 27) at the upper end is selected, the second time zone in the middle is selected, and the third time zone at the bottom is selected. As shown in FIG. 15, three public time parameters including T(TPE), T(LA), and T(NY) are selected and exported to the 3D scene map 27.

Figure 16:
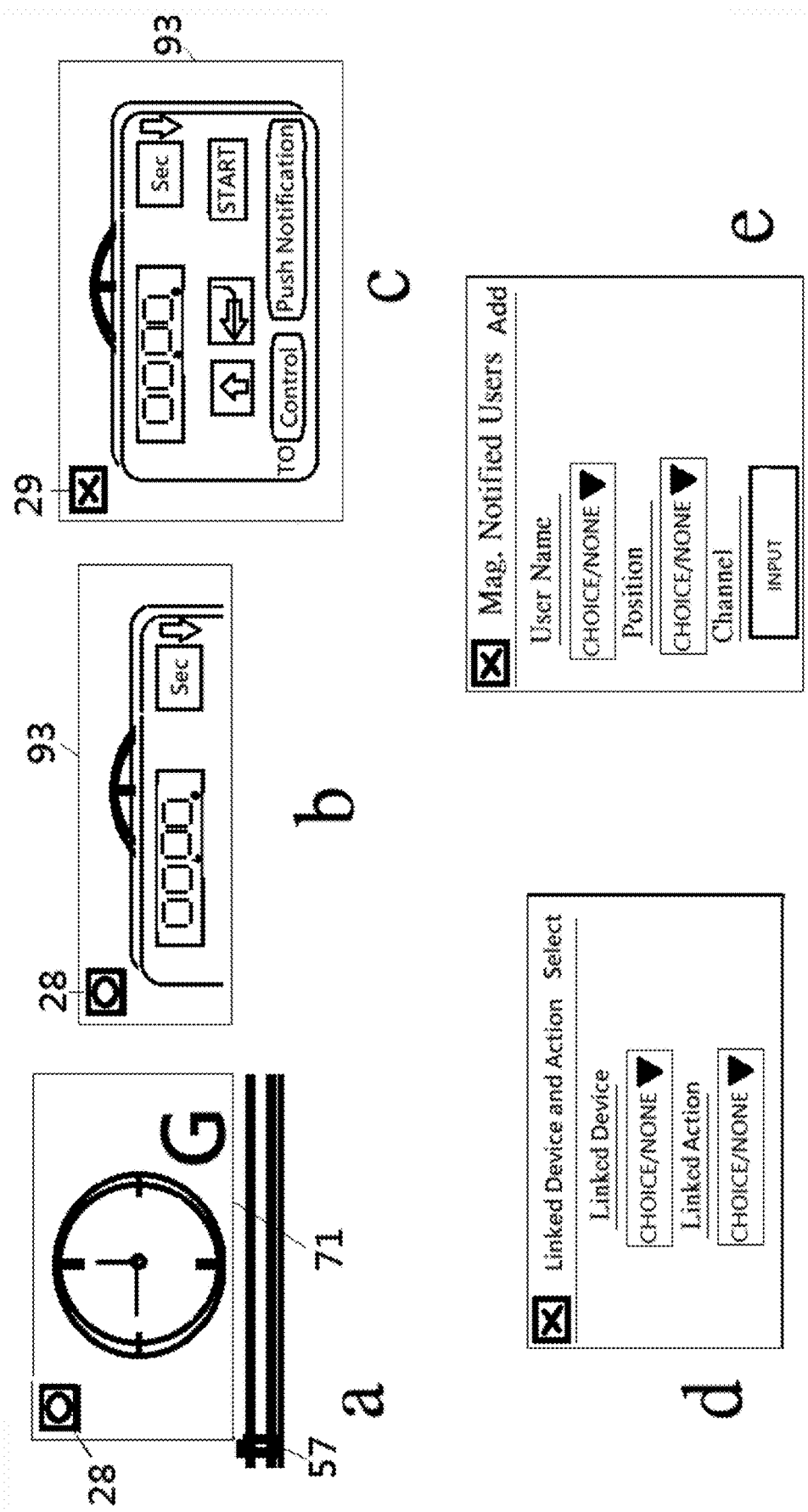
FIG. 16 shows the use of a countdown timer generator virtual tool in accordance with the present invention.

With reference to FIG. 16 for the sixteenth embodiment of the present invention, this embodiment discloses the use of a countdown timer generator virtual tool 71 in the 3D scene map 27 in the present invention 16.

In this embodiment, the way of generating a clone timer virtual tool 93, the way of setting its time and unit, and the procedure of setting linked event and push notification when a timeout (Time Out, TO) has reached.

In FIG. 16a a countdown timer generator virtual tool 71 on the slider 57 is found, and the G sign on the virtual tool is clicked to generate a clone timer virtual tool 93 as a countdown timer as shown in FIG. 16b;

In FIG. 16b, the circle button object 28 is clicked to open the clone timer virtual tool 93 in an enlarged mode as shown FIG. 16c.

In FIG. 16c, the time display column at the upper left corner shows countdown time, and the button on the right of the time display column is provided for selecting the unit of time (such as second, minute, hour, etc.), and the left button at the middle column is provided for adjusting the up-count numerical value, and the center button of the middle column is provided for confirming the final increased value and switching to the next adjustment digit of the numerical value; when the START button is started to count time down, the left button of bottom (labeled with Control) is provided for setting a timeout (Time Out, TO) linked device and linked event by opening a setting window as shown in FIG. 16d, and the bottom right button (labeled with Push Notification) is provided for setting a timeout message push notification target by opening another setting window as shown in FIG. 16e.

In FIG. 16d, the linked virtual device 21 is defined and linked to an event when the timeout (Time Out, TO) has reached, and the linked virtual device 21 is selected in the Linked Device column, and a linked event is selected in the Linked Action column, and the Select label is clicked to add the aforementioned information.

In FIG. 16e, a timeout message push notification target is set; a push notification user is selected in the User Name column; a push notification user identity is selected in the Position column; a push notification user telephone number is inputted into the Channel column, the Add label is clicked to add the aforementioned information. The clone timer virtual tool 93 will disappear automatically upon the timeout, or the TO label can be double-clicked to force the clone timer virtual tool 93 to disappear (delete).

Figure 17:
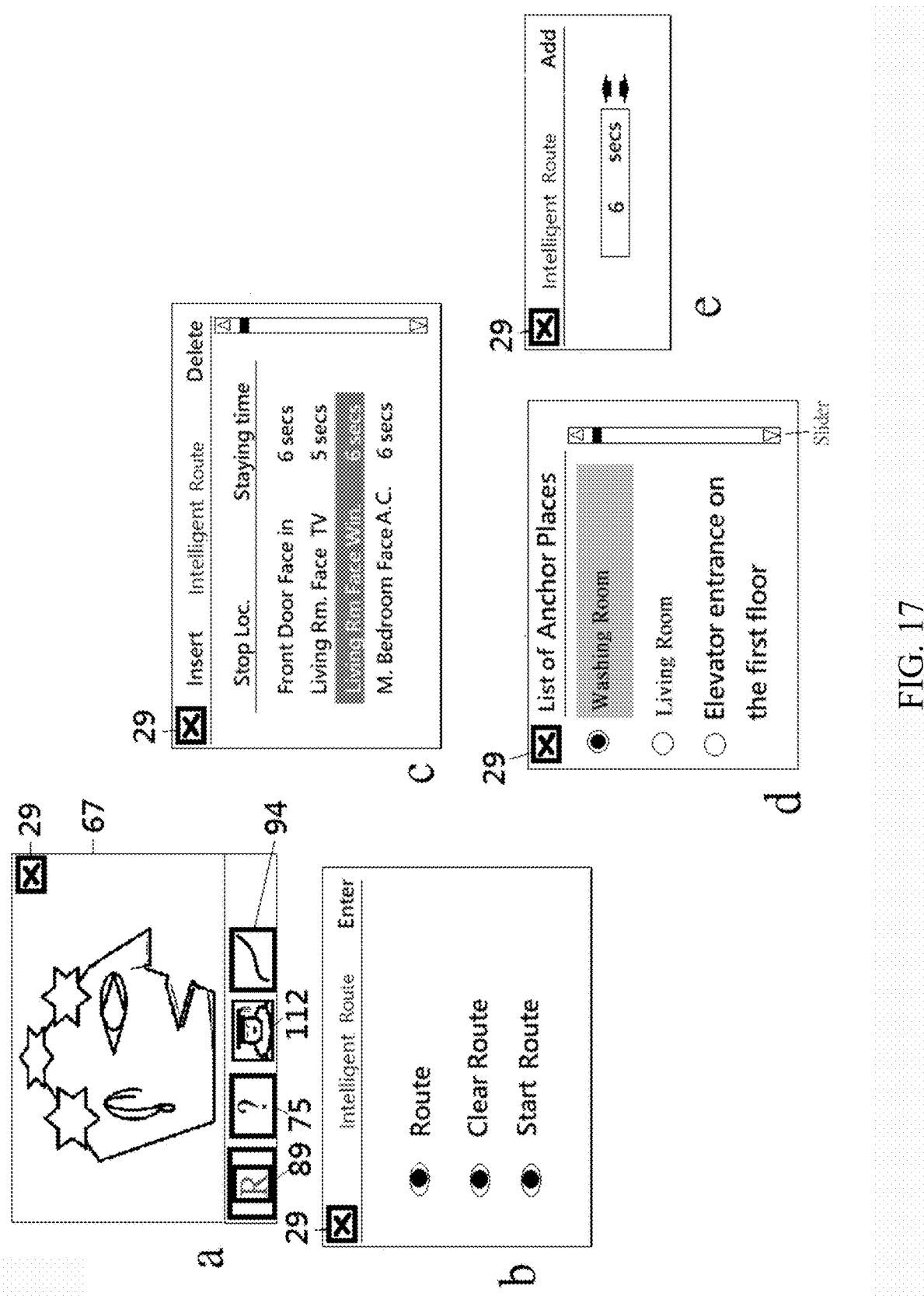
FIG. 17 shows the use of a smart housekeeper virtual tool to plan layout patrol route utilized by a virtual navigation mark in accordance with the present invention.

With reference to FIG. 17 for the seventeenth embodiment of the present invention, this embodiment discloses the use of a smart housekeeper virtual tool 67 to plan a layout patrol route utilized by a virtual navigation mark 58 in accordance with the present invention 17.

The procedure comprises the following steps: In FIG. 17a, the route plan SBO button 94 on the hidden-able control operating area 30 of the smart housekeeper virtual tool 67 is clicked to start a specific AOP procedure 51 for a route plan as shown in FIG. 17b.

In FIG. 17b, the Route portal is clicked to open an associated window object as shown in FIG. 17c.

In FIG. 17c, a slider is provided for assisting users to browse and select a Stop Loc. in the window, or click the Delete label to delete the Stop Loc., or click the Insert label to open another associated window object as shown in FIG. 17d.

In FIG. 17d, all anchor point positions in a 3D scene map 27 are listed, a left side slider is provided for browsing and selecting a station, and a new station can be added to a patrol route by double-clicking the new station, and another associated window object can be opened as shown in FIG. 17e.

In FIG. 17e, the residence time of Stop Loc. can be adjusted, and then the Add label is clicked to complete the residence time setting of this new stop station. The aforementioned procedure can be used to add or delete a stop station repeatedly.

In FIG. 17b, the Clear Route portal is clicked to clear the whole route. If the Start Route portal is clicked, the virtual navigation mark 58 will be assigned to start the route patrol. Finally, the associated window object as shown in FIG. 17a is closed to complete the whole setting procedure. This general patrol function of a virtual people is very important to property companies, particularly for the property management of tall buildings.

Based on the aforementioned second embodiment 2, a stairs transparent sensing gate generator virtual tool 62 is installed on the slider 57 and provided for generating a stairs transparent sensing gate virtual tool 74 which is a good tool for assisting the virtual navigation mark 58 to move up or down stairs in a 3D scene map 27.

Figure 18:
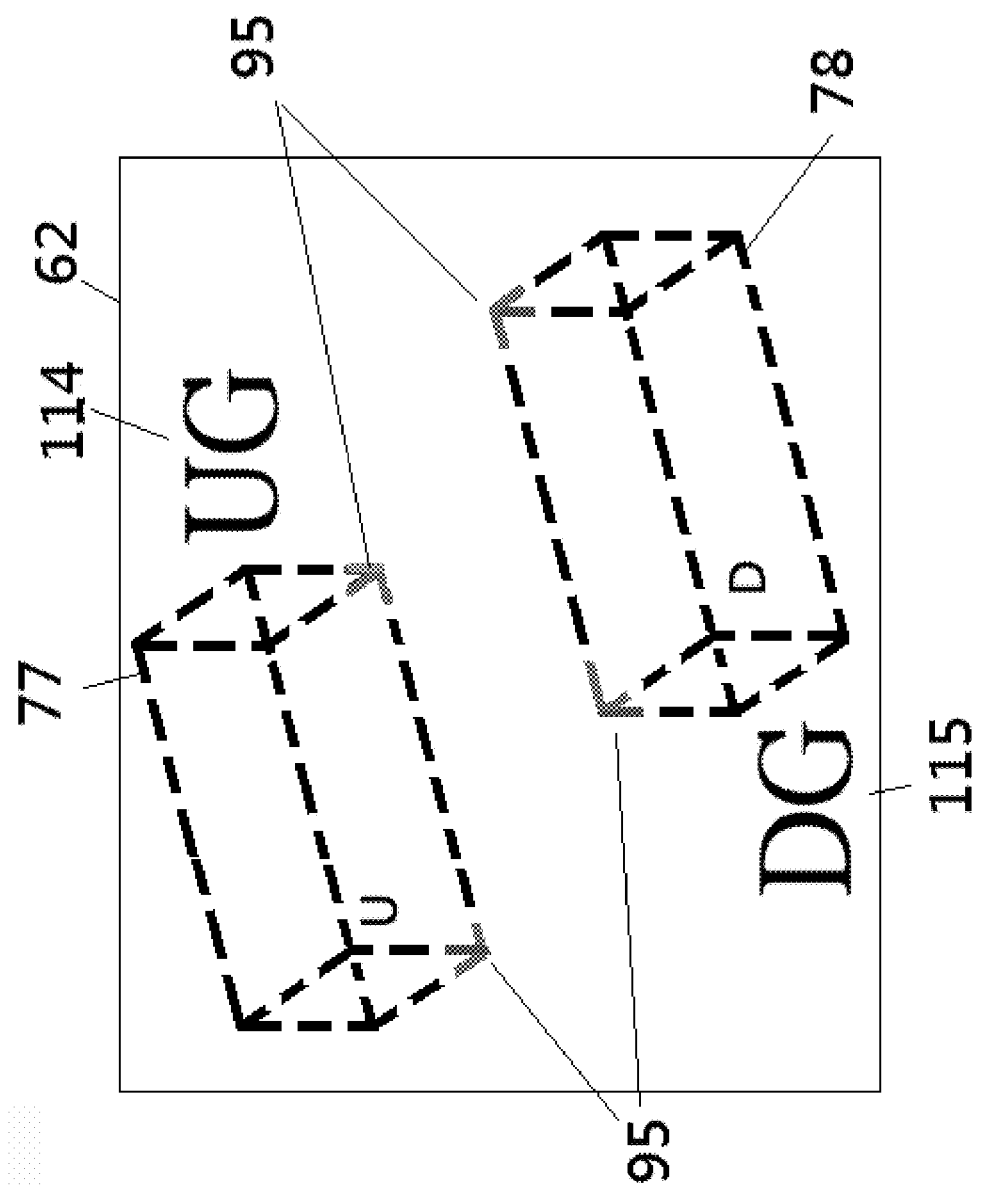
FIG. 18 shows the use of a pair of stairs transparent sensing gate generator virtual tools in accordance with the present invention.

With reference to FIG. 18 for the eighteenth embodiment of the present invention, this embodiment discloses the use of a pair of stairs transparent sensing gate virtual tool 74 in accordance with the present invention 18;

The procedure comprises the following steps. In FIG. 18, a U-half stairs transparent sensing gate generator virtual tool 114 labeled with UG is provided for producing and anchoring a U-half stairs transparent sensing gate virtual tool 77 at the exit at the upper end of the stairs, and D-half stairs transparent sensing gate generator virtual tool 115 labeled with DG is provided for producing and anchoring a D-half stairs transparent sensing gate virtual tool 78 at the front of the entrance of the stairs. UG can be clicked to generate a U-half stairs transparent sensing gate virtual tool 77, and DG can be clicked to generate a D-half stairs transparent sensing gate virtual tool 78, and then we can only see the appliance anchor point virtual tool 73 (please refer to the nineteenth embodiment described detail) (and other transparent ones cannot be seen). When the transparent sensing gate (such as a U-half stairs transparent sensing gate virtual tool 77 or a D-half stairs transparent sensing gate virtual tool 78) is anchored, the appliance anchor patch 95 is provided for aligning and pasting to the appliance anchor point virtual tool 73 disposed on the exit floor or the front side of a stair step. Since the stairs transparent sensing gate virtual tool 74 is used in pairs, therefore the installation requires the users to input the paired numbers xxxxxxx-U and xxxxxxx-D (not shown in the figure).

The appliance anchor point virtual tool 73 is disposed on the floor or on the wall used as a reference position. Another kind of appliance anchor patch 95 is another reference position disposed on the virtual device 21 or on the virtual tool 63 and used as an aligning and pasting to an appliance anchor point virtual tool 73.

The appliance anchor point virtual tool 73 is installed (disposed) for conveniently and quickly anchored the virtual device 21 or the virtual tool 63, and after this appliance anchor point virtual tool 73 is generated, an arrow pointer corresponding to the right button of a mouse can be clicked on the appliance anchor point virtual tool 73 to open an operating selection window, wherein "Move" can be selected for a moving operation, "Rotate" can be selected for a rotating operation, "Anchor" can be selected for an anchoring operation, "Delete" can be selected for a deleting operation, etc.

Figure 19:
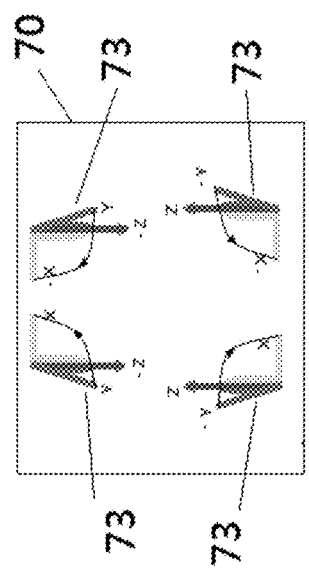
FIG. 19 shows the usage of an appliance anchor point generator virtual tool in accordance with the present invention.
Figure 19:
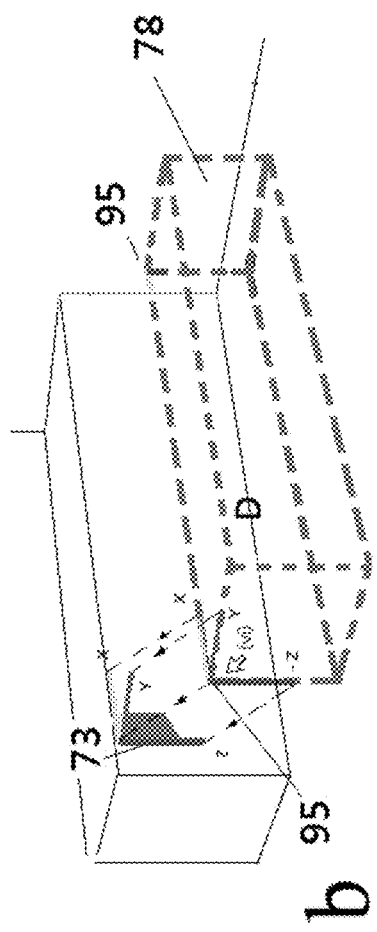
Figure 19:
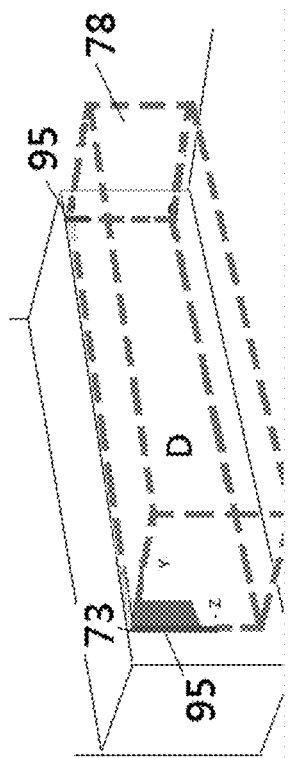

With reference to FIG. 19 for the nineteenth embodiment of the present invention, this embodiment discloses the use 19 of an appliance anchor point generator virtual tool 70 in accordance with the present invention;

FIG. 19a shows an appliance anchor point generator virtual tool 70, and four types of the appliance anchor point virtual tool 73 are provided for selection, and the right button of the mouse can be used to select Move, Rotate, and Anchorage operations.

FIG. 19b shows a D-half stairs transparent sensing gate virtual tool 78 having two appliance anchor patch 95 thereon, and a stairs entrance is at an end of the floor, and an appliance anchor point virtual tool 73 is arranged along the first step of the stairs entrance, and then a mouse can be used to click the arrow pointer position shown in FIG. 19b to indicate the next generated position. According to FIG. 18, a D-half stairs transparent sensing gate virtual tool 78 is generated when the DG 115 in the stairs transparent sensing gate generator virtual tool 62 is clicked, the D-half stairs transparent sensing gate virtual tool 78 will be generated at the aforementioned arrow pointer position of the mouse, but it will be soon attracted and attached by the nearest appliance anchor point virtual tool 73 immediately (as shown in FIG. 18b by arrows), and the D-half stairs transparent sensing gate virtual tool 78 will be attached to the first step of the stairs, so as to complete the setup.

FIG. 19c shows the complete setup of a D-half stairs transparent sensing gate virtual tool 78 (Due to the transparent sensing gate, we can see an overlapped image of the appliance anchor point virtual tool 73 disposed along the first step of the stairs and the appliance anchor patch 95 only, and the D-half stairs transparent sensing gate virtual tool 78 with a D sign. The D sign can be double-clicked to remove the D-half stairs transparent sensing gate virtual tool 78. At the other end, a U-half stairs transparent sensing gate virtual tool 77 (disposed of the exit of the upstairs stairs) can be set by the same method of the aforementioned procedure (not shown).

The 3D scene map 27 is the core of this invention, and is created by a 3D scene map quickly build App 101 that has two operating modes (including a quick building mode and a VR demo mode), four libraries (including a simple sample scene map library, a general building components library, a furniture unit library, and a scene management virtual tool library 103), a tool set (a quick building App tool set), utilizing three working windows (including a molding and scene creating window 104, a program development window 105, and a VR demo virtual window 106). In the quick building mode, there are a simple sample scene map library provided for a quick download of a sample scene, a general building components library (including doors, windows, various tiles, various glasses, various wall papers, various partitions, various frames, stairs, floors, ceilings, pitched roofs, flat roofs, skylights, sinks, etc., and a furniture unit library (including unit like as coffee tables, sofas, vases, mirrors, cabinets, dining tables and chairs, etc.), the quick building App tool set is provided for loading a building component or a furniture unit and then operating on it for extension, zoom-out, zoom-in, horizontal flip, vertical flip, rotation, anchorage after moving, so as to facilitate operations including Add a building component, Add a furniture unit, Edit a scene, Revise a scene, Delete a building component, Delete a furniture unit, Save a scene, Compile a scene and Load a scene, etc., so as to quickly complete constructing the 3D scene map 27 (such as a home house, a factory, an office, a meeting place, an exhibition hall, or a public facility), so far these scenes still have not added any of the scene management virtual tool 61 in there.

Wherein, the scene management virtual tool library 103 comprises a quick positioning marker generator virtual tool 68, a stairs transparent sensing gate generator virtual tool 62, an appliance anchor point generator virtual tool 70, a countdown timer generator virtual tool 71, a world time virtual tool 72, a virtual navigation mark 58, a smart housekeeper virtual tool 67, a target device safety certification virtual tool 65, a 3D scene map sharing usage privilege setting virtual tool 76, a slider 57, etc.;

In the scene management virtual tool library 103, each virtual tool 63 is a 3D emulation object without the behavior simulation ability, but its structure is the same as that of a virtual device 21 and also has three display modes.

Wherein, the bottom slider area 56 (or the top or right side or left side) of the slider 57 can be dragged to add objects before the 3D scene layout is finished;

In addition, the virtual navigation mark 58 can be installed while in the 3D scene layout constructing of the 3D scene map 27.

After the slider 57 is dragging in the 3D scene map 27 and using the 3D scene map quickly build App 101 to create the 3D scene map 27 quickly, the 3D scene map can enter in another VR demo mode (having a 3D VR engine capable of simulating a demo virtual environment and verifying each function of the aforementioned set of scene management virtual tools 61). Through the VR demo, the slider 57 slid from left to right (or from top to bottom) step by step, and a series of scene management virtual tools 61 can be added into the 3D scene map 27 (or be selected for execution or be removed) quickly and conveniently to provide the features of convenient operation, secured sharing and higher scene management intelligence of the 3D scene map 27.

Through the VR demo, dragging the virtual navigation mark 58 with a mouse or a finger can tour the whole 3D scene map 27, in which pairs of stairs transparent sensing gate virtual tool 74 are installed to provide the ability to sense the virtual navigation mark 58 and help the virtual navigation mark 58 to walk up and down the stairs.

After a demo of the slider 57 and the tour of the virtual navigation mark 58 are all verified, the user has to wait for the next step of installing and testing the plug-and-play function of the target device 26. After each time the plug-and-play installed step is completed, the owner user must re-compile and output a new execution file of the 3D scene map 27, and send it to a client server 97 to allow users to share and use the 3D scene map on a portable electronic device 59.

In short, the 3D scene map quickly build App 101 creates the 3D scene map 27 quickly to emulate one real world building layout, and adds a virtual navigation mark 58 for touring the 3D scene map 27, and embeds a virtual tool of the slider 57 in the bottom slider area 56, and installs a set of scene management virtual tools 61 on the slider 57, and adds at least one virtual device 21 which corresponds to one target device 26 into the 3D scene map 27 for wireless operating the corresponding target device 26 and real-time emulating its status.

The 3D scene map quickly build App 101 is placed in a scene quick build App server 99 and provided for users to download and install, and to use it to create the 3D scene map 27, and the least one target device 26 is installed in the scene, and used to define a user sharing privilege for the use of the 3D scene map 27.

As to the integrated platform and the system operation of the present invention, a manufacturer is a designer as well as the maker of the target device 26, and the virtual device 21 corresponding to the target device 26 is a core which is very important to every manufacturer and must have a set of tools for the convenient design and maintenance. The present invention further discloses a manufacturer's electrical device 98 having a manufacturer virtual device design App 102 that integrates three window programs for the operations which including a 3D model design window 107, a simulation program design window program 108, and a VR demo window program 109; a 3D model design window 107 with a plentiful geometric figures such as squares, triangles, rectangles, star shapes, polygonal shapes, etc. and a component library (including name plates, screw holes, screws, nuts, LCD panels, touch panels, seven-segments display devices, various buttons, hinges, keyboards switches, stainless steel plates, cylinders, square cylinders, etc.) for easy adding, building, loading, editing, combining, modifying, deleting and saving as the virtual device model 37 emulating the target device 26 in morphology; and a simulation program design window program 108 for original program coding and modification (such as editing, compiling, translating and debugging the emulation program package 36, that will be loaded in and operated on the virtual device model 37; a third window program: a VR demo window program 109 having a 3D VR engine capable of timely simulating a behavior (such as the second hand and minute hand of an electronic clock running in circle, a vertical fan with rotating fan vanes and a swing fan, an air-conditioner operated by a virtual remote control device, a wearable ECG measurement and display, etc.); all of these VR demos are based on the design of the virtual device model 37 and the design of the emulation program package 36. After the design and simulated demo are completed, the virtual device compressed information package 22 is outputted;

a manufacturer's electrical device 98, coupled to a the vendor's server 96 by a wireless communication method for transmitting the virtual device compressed information package 22 to a temporarily testing buffer area of the vendor's server 96; and a manufacturer can use the main control device 60 of the IoT integration platform to build a 3D scene map 27 and a testing circuit board of a target device 26 (to substitute the target device 26) and share these with the testing team members to perform an online multi-person multi-machine functional test (starting from the plug-and-play function). After the test is completed, the virtual device compressed information package 22 is transmitted to the vendor's server 96 and provided for official public use. Wherein the manufacturer's electrical device 98 can be a personal computer, a workstation, a notebook or the main control device 60.

For the safe sharing and convenient use of the 3D scene map 27, the present invention further discloses at least one 3D scene map integrated operation server 100 that is connected to the internet, and the main control device 60 transmits a storage location of the 3D scene map 27 and its sharing users list to the 3D scene map integrated operation server 100 by a wireless communication method, and the 3D scene map integrated operation server 100 provides a 3D scene map integrated operation App 110 to all users of the 3D scene map 27, so as to provide a global unified registration and a login portal (such as Lares.com). In other words, after a user uses the 3D scene map integrated operation App 110 for the registration and log in, the 3D scene map integrated operation server 100 provides a user-exclusive main webpage, in which all of the download portals of each 3D scene map 27 that shared with the user are gathered, and then the user chooses one among them to download and operate on the 3D scene map 27. The 3D scene map integrated operation server 100 provides a simple, convenient and unique registration and login method for the users. As to how many scenes of the 3D scene map 27 a user can share and use, it will be clear after the user logs in by a portable electronic device 59 (such as a notebook, a mobile phone, a tablet PC, or a humanoid robot) and the user can click one 3D scene map 27 immediately for operating on it.

Based on the aforementioned new control method with the configuration of an AOP-enhanced virtual device 52, the present invention further discloses an IoT integration platform and its system operation 20 (as shown in FIG. 20), and the IoT integration platform comprises:

The main control device 60, having a 3D scene map 27 created thereon, at least two manufacturers' electrical devices 98 (both having a manufacturer virtual device design App 102), at least two vendors' servers 96, at least one client server 97, a scene map quickly build App server 99, and at least one 3D scene map integrated operation server 100, and all of these components are coupled to the Internet for their operation;

at least two target devices 26 (provided by two different manufacturers and there are four target devices 261, 262, 263, 264 in FIG. 20 as examples), and each target device 26 corresponding to its respective virtual device 21 (decompressed from the virtual device compressed information package 22 (not shown in the figure)); wherein the electric fan target device 262 shows some target device physical buttons 117 provided for physically controlling and operating the electric fan target device 262.

Wherein, the target device 26 of each manufacturer is coupled to the main control device 60 by a short-distance communication method (such as via Wi-Fi, ZigBee, or Bluetooth communication), and the virtual device 21 sends a command to control the corresponding target device 26 through the main control device 60 and record a new status of the virtual device 21 into a database of the client server 97, and the virtual device 21 (use a synchronously update program in the emulation program package 36) timely reads back its status value from the database in the client server 97 for very several seconds (such as 3-5 seconds) to the main control device 60 (or the portable electronic device 59) to update the behavior emulation of the virtual device 21 for maintaining the state synchronization between the virtual device 21 and the target device 26 at any time.

Wherein, the two vendors' server 96 stores the corresponding announced virtual device compressed information package 22 provided for the user to download by the plug and play function when installing the target device 26, and the temporary storage area also stores the corresponding latest version of the virtual device compressed information package 22, so that the latest version can be provided for the test group 111 to download and used for testing the plug-and-play function and all other functions.

In addition, at least one portable electronic device 59 is coupled to the Internet via a wireless network or a mobile network for its operation.

In the operation method of the integrated platform system of the present invention, each manufacturer uses the manufacturer virtual device design App 102 for building, correcting, and storing the virtual device model 37 (not shown), and for an emulation program package 36 (not shown) in editing, compiling, translating, debugging, emulating demonstration of the virtual device 21, and outputting the virtual device compressed information package 22 to the vendor's server 96; and each manufacturer bases on the representative new structure of the IoT target device 26 and complies with the principle of the new control method to implement the plug-and-play function and achieve an integrated operation to provide a preliminary version of a virtual device compressed information package 22 for a new product of the target device 26 or hereafter publish a new version of the virtual device compressed information package 22 for an old product design. It is noteworthy that both of the above have gone through detailed testing procedures for the best quality.

Each building owner (or the creator entrusted by a building owner) uses a 3D scene map quickly build App 101 (downloaded and installed from a scene map quickly build App server 99) on a main control device 60 to download a simple sample scene map and modify the sample scene map into a 3D scene map 27; or quickly emulate the 3D scene map 27 from a building layout (such as a home house) and add pairs of stairs transparent sensing gate virtual tool 74 (not shown in the figure) to each stairs. In the 3D scene map 27, the virtual navigation mark 58 is installed and provided for touring and viewing the 3D scene map 27. In the bottom slider area 56 of the 3D scene map 27, a slider 57 is added and may be slid from left to right by each division area in order to add, select or remove a series of scene management virtual tools 61 in the 3D scene map 27 quickly and conveniently in order to manage the 3D scene map 27. A quick positioning marker generator virtual tool 68 is provided for easily completing a full-court anchor positioning marks placement on the 3D scene map 27 and using them for the quick and instant transposition of the virtual navigation mark 58. After the two target devices 26 are bought, the target devices 26 can be installed easily (including the naming the target devices 26 and installed the position name as described in the fourth embodiment) in the 3D scene map 27 based on the principle of the plug-and-play function. An enlarged virtual device 24 can be opened first, and then the emulation programs management SBO button 33 is clicked to open the emulation program management list window 87 of the virtual device 21, and the mag. user privilege of dev. 47 in the list is clicked to open an AOP procedure 51 in order to set the sharer's privilege of the newly installed virtual device 21. The enlarged virtual device 24 can be opened, and then the emulation program management list window 87 of the virtual device 21 is opened, and the mag. parameter of dev. 45 is clicked to start a corresponding AOP procedure 51, so that the local parameter exported becomes a public parameter provided as an intelligent control condition for later use. An enlarged virtual device 24 can be opened as above, and then the emulation program management list window 87 of the virtual device 21 is opened, and the mag. firmware updating of dev. 48 is clicked to start another AOP procedure 51 to update a new firmware for the corresponding target device 26, and then the 3D scene map sharing usage privilege setting virtual tool 76 is clicked to open an AOP procedure 51 to define the sharers of the 3D scene map 27 and set their usage privilege. Finally, the source files are saved and the execution file of the 3D scene map 27 is compiled output and then sent to a client server 97 for storage, and the storage location of the 3D scene map 27 (which is indicated a position on the client server 97) and its sharing user list are transmitted to the 3D scene map integrated operation server 100.

Each user uses the 3D scene map integrated operation App 110 in the portable electronic device 59 to register the 3D scene map integrated operation server 100 and then log in so that the user can immediately enter into an exclusive main webpage in which all the download portals of each 3D scene map 27 that shared with the user are gathered, and then the user can easily select one 3D scene map 27 among them for the operations as followed. For example, the user can use a finger or a mouse to drag the virtual navigation mark 58 and tour the 3D scene map 27 and check the status of the virtual device 21, or lead the virtual navigation mark 58 to go up or down the stairs by a finger or a mouse, or control a normal sized virtual device 23, or control an enlarged virtual device 24 or control a full screen virtual device 25; or open an enlarged virtual device 24, and then click the emulation programs management SBO button 33 in the hidden-able control operating area 30 to open the emulation program management list window 87 again in order to check the name and installation position of the target device 26; or open the emulation program management list window 87, and click the mag. status push notification of dev. 44 to open a corresponding AOP procedure 51 for setting a push notification target and a push event; or enter into enlarged mode of the quick positioning marker generator virtual tool 68, and click the list anchors SBO button 50 in order to select one location item, and then let the transposition arrive there quickly; or call the smart housekeeper virtual tool 67 to assist searching and quickly positioning a virtual device 21 to check the status or control on the virtual device 21 conveniently; or enter into an enlarged virtual device 24 and click the intelligent control settings SBO button 35 in the hidden-able control operating area 30 to open a corresponding AOP procedure 51 (not shown in the figure) to perform a complex parameter intelligent conditional expression setting and an intelligent control action setting; or call the smart housekeeper virtual tool 67 and click the housekeeping intelligent control settings SBO button 112 to start a corresponding AOP procedure 51 to perform a complex parameter intelligent conditional expression setting and a plurality of heterogeneous intelligent control action settings, etc.

Wherein, the client server 97 stores at least one 3D scene map integrated operation platform information set 113 (not shown in the figure), there are: the source file of the 3D scene map 27, the execution file of the 3D scene map 27, the installed content of the slider 57, the full-court anchor placement information on the 3D scene map 27, the user sharing list of the 3D scene map 27, the user sharing list of each virtual device 21, the parameter export list of all virtual devices 21, the intelligent control setting data of all virtual devices 21, the complex parameter intelligent conditional expression setting and the plurality of heterogeneous intelligent control setting data of all smart housekeeper virtual tool 67, etc.

The main control device 60 also stores the data of each version of the 3D scene map integrated operation platform information set 113, and the details are the same as above, and thus will not be repeated here.

Each portable electronic device 59 stores the position information of the virtual navigation mark 58 in the 3D scene map 27 shared by the users, and a different position of the virtual navigation mark 58 indicates a different observation position of the user.

The 3D scene map integrated operation server 100 continuously produces users' latest exclusive main webpages, in which gathered all the download portals of each 3D scene map 27 that is shared with the users, and every user can select one among them to operate on it.

In summation of the description above, the manufacturer manufactures the target device 26 based on the plug-and-play standard and designs the virtual device compressed information package 22 based on the configuration of the AOP-enhanced virtual device 52.

Each building owner (or the creator entrusted by the building owner) can use the 3D scene map quickly build App 101 to create a 3D scene map 27 on the main control device 60 and introduce a set of scene management virtual tools 61 to manage, maintain and share the 3D scene map 27. Based on the support of the plug-and-play function in the 3D scene map 27, certifications can be made easily and different manufacturers' virtual devices 21 can be installed conveniently. With the enhanced management by the emulation program package 36, many AOP procedures 51 can be expanded to manage, maintain and share the virtual device 21;

Each user can use the 3D scene map integrated operation App 110 in the portable electronic device 59 to register and log in to the 3D scene map integrated operation server 100 and enter into a personal exclusive main webpage to select one 3D scene map 27 for operating. The virtual navigation mark 58 can be dragged to tour the scenes, check and control the virtual device 21; set the push notification condition and event; arrange the complex parameter intelligent conditional expression and the intelligent control setting; and set the complex parameter intelligent conditional expression setting and the plurality of heterogeneous intelligent controls, etc.

In summation of the description above, the present invention is based on a new control method of a new representative structure of the target device 26 to achieve the integration of the platform of the IoT, as well as providing a system operation method to achieve a complete, safe and effective management on integrated operation, control, and post-level maintenance and update services in the future development of the target device 26 under the configuration of this AOP-enhanced virtual device 52.

While the invention has been described by means of specific embodiments, numerous modifications and variations could be made thereto by those skilled in the art without departing from the scope and spirit of the invention as set forth in the claims.

What is claimed is:

1. An IoT integration platform, comprising:
a main control device, coupled to the Internet, and having a controlling and displaying interface for control operating and display, and a scene display area of the controlling and displaying interface for displaying a 3D scene map created by a 3D scene map quickly build App, wherein the 3D scene map quickly build App is external to the IoT integration platform and has two operating modes, four libraries, a tool set, and utilizes three working windows including a molding and scene creating window, a program development window, and a VR demo virtual window, and the main control device constructing the 3D scene map, installing virtual tools, emulating verification by VR demo, and finally creating the 3D scene map emulating a 3D building layout of interest of a real world, and a bottom slider area of the controlling and displaying interface further comprising a slider, divided into serially connected division areas, each configured to install the virtual tools used in the 3D scene map for assisting in scene management; at least two target devices, provided by at least two different manufacturers respectively, and coupled to the main control device via a wireless network; at least one server, coupled to the Internet, and having a database for storing each status of each target device; at least two virtual devices corresponding to the at least two target devices respectively, and having three display modes: a normal sized virtual device, an enlarged virtual device and a full screen virtual device, and having two parts: a virtual device model having at least one sensible area or button and at least one emulation program package loaded in and operated on the virtual device model, each of the at least two virtual devices is created by using a manufacturer virtual device design App which integrates three window programs including a 3D model design window, a simulation program design window program, and a VR demo window program for constructing 3D model, developing simulation programs, VR demo verifying, and finally for completing the virtual device, and the main control device sending out a corresponding control command via a network to control the corresponding target device while the sensible area or button on the virtual device is selected or clicked, updating a new status value into the database on the server and self-updating to a new simulation status, reading back the status value from the database every 3 seconds, and updating the status of the virtual device for maintaining the state synchronization with the target device; the virtual device model emulates external shape and key components of the target device, and operations, control, and status display simulating those of the target device, and integrating the control and status display together on the virtual device model; at least one portable electronic device, coupled to the Internet via a wireless network or a mobile network, for downloading the 3D scene map, navigating on the 3D scene map, and controlling and displaying the virtual device on the 3D scene map; at least one client server coupled to the main control device via a wireless network, for storing a sharer's information of the 3D scene map and the 3D scene map sent from the main control device, and then loading the 3D scene map into the portable electronic device, enabling a user to operate or control the target devices on the portable electronic device based on the 3D scene map; and at least one vendor's server, coupled to the main control device via a wireless network, for storing the corresponding issued virtual device compressed information package created by a vendor for the target device, and downloading into the 3D scene map when performing a plug-and-play installation of the target device, and then decompressing the virtual device compressed information package into two parts including the virtual device model having the sensible area or button and the emulation program package loaded in and operated on the virtual device model, and the virtual device model and the emulation program package are cooperating together as a virtual device; wherein a virtual navigation mark is a virtual tool provided in the 3D scene map, the virtual navigation mark has a 5-zone structure with dragging capability and carries a 3D virtual world perspective lens at the back for browsing the 3D scene map and viewing the virtual device status by dragging the virtual navigation mark; wherein, the two target devices and the installed main control device are installed in the same building, so that when a user operates and controls the virtual device, the virtual device sends a corresponding control command to each respective target device through the main control device, and simulates the operation action and status thereof; wherein, after a new virtual device corresponding to a new target device is newly installed in the 3D scene map, a source file of the 3D scene map has to be re-compiled to output a new execution file which is stored in at least one client server and provided for the portable electronic device to download and operate on it.

2. The IoT integration platform as claimed in claim 1, further comprising at least one 3D scene map integrated operation server, for collecting all storage locations of the 3D scene map of the IoT integration platform and each 3D scene map sharer's information; and providing a single simple registration and a login portal webpage for all 3D scene map users by a 3D scene map integrated operation App, and collecting and creating a personal most updated main webpage for each registered 3D scene map user, and in which collecting and editing all 3D scene map entrances of the users; when a user uses a 3D scene map integrated operation App in a portable electronic device to login the portal webpage of the 3D scene map integrated operation server, the user can enter into the user's personal most updated main webpage immediately in order to select and operate the 3D scene map downloaded from the main webpage conveniently.

3. The IoT integration platform as claimed in claim 1, wherein the bottom slider area of the controlling and displaying interface further comprises the slider which is divided into a plurality of division areas, and when the slider slides to a different division area, the controlling and displaying interface pops a different virtual tool at disposed a position adjacent to the slider and provided for a user's selection and use; and if the popped virtual tool is empty, a virtual tool is selectively added; and if the popped virtual tool is not empty, then the virtual tool is selectively used or removed; and then a virtual tool may be added into the removed empty division area at any time.

4. The IoT integration platform as claimed in claim 3, wherein the virtual tool further comprises a quick positioning marker generator virtual tool including a quick positioning marker settings G button, labeled G sign, and a list anchors Specific Button Object (SBO) button having an anchor model disposes on the hidden-able control operating area of the quick positioning marker generator virtual tool; the quick positioning marker settings G button is provided for the user to generate and to place a quick positioning marker virtual tool in the 3D scene map, and the list anchors SBO button provides for listing all quick positioning marker virtual tools are already set in the 3D scene map; when one of the quick positioning marker virtual tools in the quick positioning marker virtual tool list is clicked, the 3D scene map will be instantly switched to the location of the selected quick positioning marker virtual tool.

5. The IoT integration platform as claimed in claim 3, wherein the virtual tool further comprises a 3D scene map sharing usage privilege setting virtual tool, for defining a sharing user of the 3D scene map and a user privilege thereof.

6. The IoT integration platform as claimed in claim 3, wherein the virtual tool further comprises a stairs transparent sensing gate generator virtual tool contains UG and DG two sign labels for generating U-half stairs transparent sensing gate virtual tool and D-half stairs transparent sensing gate virtual tool disposed at the upper and lower ends of stairs respectively, and capable of sensing a specific virtual tool and performing a response; the stairs transparent sensing gate virtual tool in a 3D scene map is built in pairs of the U-half stairs transparent sensing gate virtual tool and the D-half stairs transparent sensing gate virtual tool, so that when the specific virtual tool touches an entrance at D-half stairs transparent sensing gate virtual tool, the position of the specific virtual tool is instantly switched to an exit at U-half stairs transparent sensing gate virtual tool; conversely, when the specific virtual tool touches the entrance at U-half stairs transparent sensing gate virtual tool, the position of the specific virtual tool is instantly switched to the exit at D-half stairs transparent sensing gate virtual tool; wherein the specific virtual tool comprises at least the virtual navigation mark.

7. The IoT integration platform as claimed in claim 3, wherein the virtual tool further comprises a smart housekeeper virtual tool at least for assisting in searching a virtual device in the 3D scene map and switching to the location of the searched virtual device immediately; and also for setting a combination of complex intelligent parameter conditional expression setting and a homogeneous/heterogeneous intelligent control setting and executing according to the setting; and for defining, adding, or deleting a station of an automatic patrol route in the 3D scene map, and starting an automatic patrol.

8. The IoT integration platform as claimed in claim 3, wherein the virtual tool further comprises a world time virtual tool for producing and exporting world time parameters including the time of a local area and two other world areas in the world for later defining the intelligent control used in the 3D scene map.

9. The IoT integration platform as claimed in claim 3, wherein the virtual tool further comprises a countdown timer generator virtual tool for producing a countdown timer, in which capable of setting the properties of the counted time unit in the unit of minute or second, or hour and the counted time length, and the message and target of push notification and the intelligent control action in a linked device launched when timeout, and capable of staring the timer counting.

10. The IoT integration platform as claimed in claim 1, wherein the virtual navigation mark performs a patrol in the 3D scene map according to a predetermined patrol route, firstly by using a quick positioning marker virtual tool for placing a plurality of stop locations in the 3D scene map, and then a smart housekeeper virtual tool used for planning a route, by defining a staying time at each of the stop locations, and finally assigning the virtual navigation mark to perform a patrol route automation.

11. The IoT integration platform as claimed in claim 1, wherein one of the at least two target devices uses a plug-and-play method to download a virtual device compressed information package stored in the vendor's server into the 3D scene map, and then decompress the virtual device compressed information package into two parts including the virtual device model having at least one sensible area or button and at least one emulation program package loaded in and operating on the virtual device model, and cooperating as the virtual device; wherein the plug-and-play method comprises:

in response to a user placing a newly bought target device in a room and connecting it to an electric power outlet in the 3D building of interest of the real world, the target device, upon being powered on and having a hard reset activated by the user, automatically configures a server in server mode within the target device;

the main control device executes the 3D scene map quickly build App, and opens the source file of the 3D scene map corresponding to the 3D building of interest of the real world; and navigating to the corresponding room where the target device is disposed;

according to the product user guide using a mobile phone to connect the target device, and giving an SSID and a PASSWORD of the main control device to the target device;

a soft reset issued by the mobile phone to the server in the target device to client mode, to let the target device login to the main control device automatically by the given SSID and PASSWORD information;

the main control device issues an inquiry about product information including the security number to the target device; the product information that contained a security number was transmitted to a receiving unit of the main control device from the target device; the main control device forward the product information to the target device safety certification virtual tool for a preliminary inspection; and then forwarding the security number to a certification center by the target device safety certification virtual tool for a security certification;

while the main control device received the security certification ok from the cloud, the IP of the vendor's server stored the virtual device compressed information package and the downloading password can be received from the cloud of the internetwork;

the main control device used the received IP of the vendor's server and the downloading password to download the virtual device compressed information package into the source file of a 3D scene map opening by a 3D scene map quickly build App, and decompressing it;

after decompressing, the source file of the 3D scene map is saved and the execution files of the 3D scene map are compiled output and then sent it to a client server for storage and later for download use by the portable electronic device.

12. A method for controlling and displaying a target device in an Internet of Things, the Internet of Things comprising at least one target device of a real world, an electronic device, and at least one database on a server, the target device in a 3D building layout of interest of the real world, displayed on the electronic device, used as a target for model emulating and behavior emulation of controlling and displaying status, the electronic device having a processor system and a controlling and displaying interface and could couple to the target device and the server via a network, and the database used as status storage of the target device, the method comprising a plurality of steps:

displaying a virtual device emulating the target device within a 3D scene map and the 3D scene map of a 3D virtual world emulating the 3D building layout of interest of the real world contained the target device by the controlling and displaying interface, wherein the virtual device and the 3D scene map are realized from an executable computer program executed by the electronic device, and the 3D scene map is created by a 3D scene map quickly build App that has two operating modes, four libraries, a tool set, and utilizes three working windows including a molding and scene creating window, a program development window, and a VR demo virtual window, and via constructing 3D scene map, installing virtual tools, verifying with VR demo to creating the 3D scene map, the virtual device in a 3D mode represents the target device, and the virtual device in a 3D mode is formed by a virtual device model having at least one sensible area or button and at least one emulation program package loaded in and operated on the virtual device model, and the virtual device is created by using a manufacturer virtual device design App which integrates three window programs including a 3D model design window, a simulation program design window program, and a VR demo window program, via constructing virtual device model, developing simulation programs, and VR demo verifying, and finally for completing the virtual device;

sending out a related control command by the processor system via a network to control the target device, wherein the control command is triggered by the virtual device while at least one of the sensible area or button is selected or clicked;

updating a new status value of the target device into the database on the server and making the virtual device be self-updated to a new simulation status by the processor system through the controlling and displaying interface; and reading back the status value in the database every 3 seconds to update the simulation status of the virtual device by the processor system through the controlling and displaying interface for maintaining the status synchronization with the target device;

wherein the virtual device model has an external shape that emulates external shape and key components of the target device, and operations, control, —and a status display simulating those of the target device.

13. The method as claimed in claim 12, wherein the virtual device further comprises three display modes corresponding to a normal sized virtual device, an enlarged virtual device, and a full screen virtual device respectively, for carrying out a real-time emulation of the morphology and behavior of a target device based on changes over time; the normal sized virtual device has a size proportional to the 3D scene map and capable of being moved, fixed, and placed at a position corresponding to the target device; the normal sized virtual device has a circle button disposed at the upper right corner thereof; the enlarged virtual device has a hidden-able control operating area disposed at a lower edge thereof, an X button shown at the upper right corner of the enlarged virtual device during the hidden-able control operating area display, and a plurality of specific buttons disposed on the hidden-able control operating area and provided for enabling a specific functional procedure; and the full screen virtual device refers to the virtual device using the whole scene display area of the controlling and displaying interface for display and enlargement when a full screen virtual device SBO button in the hidden-able control operating area is clicked, and its upper right corner has an X button for turning off the full screen virtual device;

when the circle button of the normal sized virtual device is clicked, the hidden-able control operating area appears for selecting a sensible area or button to operate, and the normal sized virtual device extends in the same place and becomes an enlarged virtual device, and when the X button of the enlarged virtual device is clicked, the hidden-able control operating area disappears and the enlarged virtual device reverts back to the normal sized virtual device in the same place; the hidden-able control operating area disappears when it is not needed for selecting sensible areas or buttons to operate, making the controlling and displaying interface cleaner;

wherein the hidden-able control operating area further comprises:

an emulation programs management Specific Button Object (SBO) button, for listing a plurality of functions managed by the virtual device; an emulation program management list window appears after the emulation programs management SBO button is clicked, wherein a plurality of functions listed in the emulation program management list window and the functions listed in the emulation program management list window include a physical parameter export function used for exporting a physical parameter of the target device, and after the physical parameter export function is executed, the physical parameter and its numerical value of the target device can be accessed and used by other virtual devices; and an intelligent control settings Specific Button Object (SBO) button, can launch an operation window, and a dialog window can be invoked sequentially by clicking Add label in the operation window; the operation window is used for browsing, deleting, or adding a combination of complex parameter intelligent conditional expression setting and an intelligent control action setting; the dialog window is for adding a combination of complex parameter intelligent conditional expression setting and the intelligent control action setting for the virtual device to achieve the complex intelligent condition control and operation which is originally unavailable on the target device.

14. The method as claimed in claim 13, wherein the hidden-able control operating area further comprises a moving/anchored Specific Button Object (SBO) button, such that after the moving/anchored SBO button is clicked, the virtual device can be moved freely on the 3D scene map and finally set and anchorage fixed in the 3D scene map.

15. The method as claimed in claim 13, wherein the hidden-able control operating area further comprises a simulation control interface SBO button, and after the simulation control interface SBO button is clicked, a simulation control interface will pop out, and the simulation control interface emulates key components of a control interface of the target device, or merely virtual emulated and expanded on the controlling and displaying interface.

16. The method as claimed in claim 13, wherein the emulation programs management SBO button is provided for listing a plurality of management functions in which further include the management of a virtual device user and a usage permission, for defining a shared user of the virtual device and the usage permission of the shared user.

17. The method as claimed in claim 13, wherein the emulation programs management SBO button is provided for listing a plurality of management functions in which further include a message push notification management, for setting a push notification target, a push channel and a push occurrence condition.

18. The method as claimed in claim 13, wherein the emulation programs management SBO button is provided for listing a plurality of management functions in which further include a target device firmware update management for searching the most updated firmware version, starting the firmware to update or recovering to the previous version.

19. The method as claimed in claim 13, wherein the emulation programs management SBO button is provided for listing a plurality of management functions in which further includes an emulation program package self-update management of the virtual device for searching the most updated emulation program package version, and starting the emulation program package update or recovering to the previous version.

20. The IoT integration platform as claimed in claim 3, wherein the virtual tool further comprises an appliance anchor point generator virtual tool and an appliance anchor patch, in which the appliance anchor point generator virtual tool for generating and laying the appliance anchor point virtual tool on the wall/floor/stair-step in the 3D scene map; and the appliance anchor patch is attached to the virtual device/virtual tool; while the appliance anchor patch attached to the virtual device/virtual tool is closing to near the appliance anchor point virtual tool, the virtual device/virtual tool may could auto attracted and patched onto the appliance anchor point virtual tool that disposed on the wall/floor/stair-step in 3D scene map; in a 3D scene map, the appliance anchor point virtual tool and the appliance anchor patch are used to let the stairs transparent sensing gate virtual tool layout disposition, and the virtual device/virtual tool placement more conveniently and easily.

* * * * *